(12) United States Patent
Matsushita et al.

(10) Patent No.: US 11,391,603 B2
(45) Date of Patent: Jul. 19, 2022

(54) MULTI-CORE OPTICAL FIBER AND METHOD FOR MANUFACTURING MULTI-CORE OPTICAL FIBER

(71) Applicant: Fujikura Ltd., Tokyo (JP)

(72) Inventors: Shingo Matsushita, Mie (JP); Takuya Oda, Chiba (JP)

(73) Assignee: FUJIKURA LTD., Tokyo (JP)

( * ) Notice: Subject to any disclaimer, the term of this patent is extended or adjusted under 35 U.S.C. 154(b) by 5 days.

(21) Appl. No.: 17/255,793

(22) PCT Filed: Jul. 17, 2019

(86) PCT No.: PCT/JP2019/028163
§ 371 (c)(1),
(2) Date: Dec. 23, 2020

(87) PCT Pub. No.: WO2020/017565
PCT Pub. Date: Jan. 23, 2020

(65) Prior Publication Data
US 2021/0270642 A1    Sep. 2, 2021

(30) Foreign Application Priority Data

Jul. 17, 2018  (JP) .............................. JP2018-134486

(51) Int. Cl.
*G01D 5/353*   (2006.01)
*C03B 37/012*  (2006.01)
(Continued)

(52) U.S. Cl.
CPC ...... *G01D 5/3538* (2013.01); *C03B 37/01211* (2013.01); *C03B 37/02745* (2013.01); *G02B 6/02042* (2013.01); *C03B 2203/20* (2013.01)

(58) Field of Classification Search
None
See application file for complete search history.

(56) References Cited

U.S. PATENT DOCUMENTS 4,478,488 A   10/1984   Bagley
8,116,601 B2   2/2012   Prisco
(Continued)

FOREIGN PATENT DOCUMENTS

CA     2971051 C  * 12/2019  ......... G01D 5/35351
CN   103765264 A    4/2014
(Continued)

OTHER PUBLICATIONS

Fini, John M., et al., "Crosstalk in multicore fibers with randomness: gradual drift vs. short-length variations," Optics Express, 2012, vol. 20, No. 2, p. 949-959 (11 pages).
(Continued)

*Primary Examiner* — Michelle R Connelly
(74) *Attorney, Agent, or Firm* — Osha Bergman Watanabe & Burton LLP

(57) ABSTRACT

A multi-core optical fiber includes a central core disposed at the center of a cladding; and outer cores helically wound around the central core. The following Formula (1) is satisfied:

$$n_{e1} \times \left(\frac{1}{f_w} - B\right) < n_{e2ave} \times \left(\frac{1}{f_w} + A\right) < n_{e1} \times \left(\frac{1}{f_w} + B\right) \quad (1)$$

$$A = \sqrt{\left(\frac{1}{f_w}\right)^2 + (2\pi d_{ave})^2} - \frac{1}{f_w}$$

$$B = \frac{A}{1 + A \cdot f_w}$$

where $d_{ave}$ is an average of a distance d between the central core and the outer cores, $f_w$ is the number of helical turns of the outer cores per unit length, $n_{e1}$ is an effective refractive
(Continued)

index of the central core, and $n_{e2ave}$ is an average of effective refractive indices of the outer cores.

15 Claims, 7 Drawing Sheets

(51) Int. Cl.
*C03B 37/027* (2006.01)
*G02B 6/02* (2006.01)

(56) References Cited

U.S. PATENT DOCUMENTS

| | | | |
|---|---|---|---|
| 8,630,515 B2 | 1/2014 | Childers et al. | |
| 8,773,650 B2 | 7/2014 | Froggatt et al. | |
| 9,417,057 B2 | 8/2016 | Hooft et al. | |
| 10,983,268 B2* | 4/2021 | Froggatt | G01D 5/35303 |
| 2017/0370704 A1 | 12/2017 | Froggatt et al. | |
| 2018/0195856 A1 | 7/2018 | Reaves et al. | |
| 2021/0199884 A1* | 7/2021 | Froggatt | G01D 5/35393 |

FOREIGN PATENT DOCUMENTS

| | | | | |
|---|---|---|---|---|
| CN | 110208361 B | * | 6/2021 | ............ G01N 27/64 |
| EP | 2721434 B1 | * | 5/2021 | ............ G01B 11/16 |
| JP | 2012211964 A | * | 11/2012 | |
| JP | 2012211964 A | | 11/2012 | |
| JP | 5232982 B2 | | 7/2013 | |
| JP | 5413931 B2 | | 2/2014 | |
| JP | 6360929 B1 | | 7/2018 | |
| JP | 6722368 B2 | * | 7/2020 | ....... C03B 37/01211 |
| WO | 2017144667 A1 | | 8/2017 | |
| WO | 2017196536 A1 | | 11/2017 | |

OTHER PUBLICATIONS

"LUNA Fiber Optic Shape Sensing," Literature No. SS00021-D-TS, Luna Innovations Incorporated, Jun. 21, 2013 (6 pages).
P.S. Westbrook, et al., "Integrated optical fiber shape senor modules based on twisted multicore fiber grating arrays," Proc. SPIE 8938, Optical Fibers and Sensors for Medical Diagnostics and Treatment Applications XIV, 8938H, Feb. 20, 2014 (7 pages).
International Search Report issued in corresponding International Application No. PCT/JP2019/028163, dated Sep. 10, 2019 (3 pages).

* cited by examiner

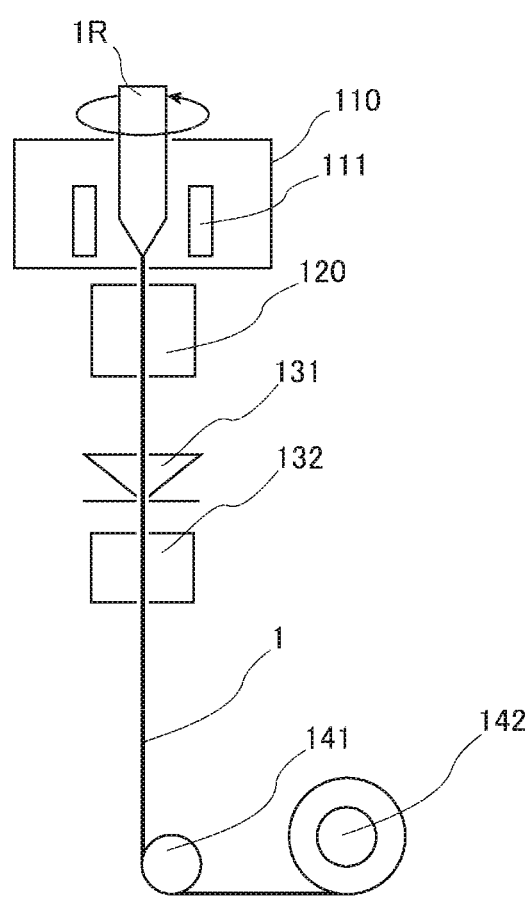

MULTI-CORE OPTICAL FIBER AND METHOD FOR MANUFACTURING MULTI-CORE OPTICAL FIBER

TECHNICAL FIELD

The present invention relates to a multi-core optical fiber and a method for manufacturing the multi-core optical fiber.

BACKGROUND

An optical fiber sensor uses an optical fiber as a sensor to measure various physical quantities such as stress, strain, and temperature. Known examples of this include an optical fiber sensor to measure the above-described various physical quantities on the basis of results after reception of transmission light or scattered light emitted from one end of the optical fiber after input of light from the other end of the optical fiber, or on the basis of results obtained by receiving reflected light or scattered light emitted from one end of the optical fiber. Typical examples of such an optical fiber sensor include an FBG type optical fiber sensor and a scattered light type optical fiber sensor.

The FBG type optical fiber sensor has Fiber Bragg Gratings (FBG) formed in the core of the optical fiber, and utilizes a property that the reflection characteristic of the FBG varies depending on the surrounding environment to measure the profile of various physical quantities in the longitudinal direction of the optical fiber. Note that the FBG type optical fiber sensor is used in Optical Frequency Domain Reflectometry (OFDR), for example. The scattered light type optical fiber sensor uses an optical fiber with no formation of FBG or the like as a sensor, and uses the property that scattered light such as Rayleigh scattered light generated in the optical fiber varies depending on the surrounding environment to measure the profile of various physical quantities in the longitudinal direction of the optical fiber.

Patent Literatures 1 and 2 below disclose techniques for measuring, for example, strain generated in a structure by OFDR using an FBG type optical fiber sensor. Patent Literatures 3 to 6 and Non-Patent Literatures 1 and 2 below disclose optical fiber sensors in which an FBG is formed in a multi-core optical fiber having a plurality of cores. For example, Non-Patent Literature 2 below states that the shape of the optical fiber sensor is measured by OFDR.

Here, the multi-core optical fiber includes: a core (central core) formed at the center of the optical fiber; and a plurality of cores (outer cores) helically wound around the central core. In this multi-core optical fiber, the outer cores are formed at individual intervals of 120°, for example, with respect to the central core. Patent Literatures 3 to 6 and Non-Patent Literatures 1 and 2 below state that an FBG is formed in each of the cores of such a multi-core optical fiber.
[Patent Literature 1] JP 5232982 B
[Patent Literature 2] JP 5413931 B
[Patent Literature 3] U.S. Pat. No. 8,116,601
[Patent Literature 4] U.S. Pat. No. 8,630,515
[Patent Literature 5] U.S. Pat. No. 8,773,650
[Patent Literature 6] U.S. Pat. No. 9,417,057
[Non-Patent Literature 1] P. S. Westbrook et al., "Integrated optical fiber shape senor modules based on twisted multicore fiber grating arrays", Proc. SPIE 8938, Optical Fibers and Sensors for Medical Diagnostics and Treatment Applications XIV, 89380H (Feb. 20, 2014)

[Non-Patent Literature 2] "LUNA Fiber Optic Shape Sensing", Literature #: SS00021-D-TS, Luna Innovations Incorporated, Jun. 21, 2013

Meanwhile, in the multi-core optical fiber having the central core and the outer core described above, the central core is formed along a central axis of the optical fiber, while the outer core is formed to be helically wound around the central core. This configuration makes the structural length of the outer core longer than the structural length of the central core. Therefore, when such a multi-core optical fiber is used as an optical fiber sensor, even when a specific position of the multi-core optical fiber is measured, there may be a difference in the optical path length from the end of the multi-core optical fiber to the specific position between the central core and the outer core. For example, in the configuration of the multi-core optical fiber disclosed in Non-Patent Literature 1 described above, assuming that the fiber length is 2 m, the core pitch is 35 µm, and the number of helical turns of the outer core is 50 turns/m, the structural length difference between the central core and the outer core is about 120 µm from one end to the other end of the optical fiber.

Here, the resolution in the length direction of the optical fiber in OFDR is approximately 40 µm, for example. Therefore, when using a multi-core optical fiber having the outer core helically wound around the central core is used as an optical fiber sensor, there is a concern that the structural length difference between the central core and the outer core might deteriorate positional accuracy in the longitudinal direction to be measured. In particular, lengthening a multi-core optical fiber being an optical fiber sensor would increase the error in the detection position due to the structural length difference between the central core and the outer core, leading to a concern of measurement accuracy deterioration over the entire length of the optical fiber sensor. Furthermore, the FBG is generally formed by light emission from the side of the optical fiber. Therefore, the pitch of the FBGs formed in the central core along the longitudinal direction of the multi-core optical fiber tends to differ from the pitch of the FBGs formed on the helical outer core diagonally arranged with respect to the longitudinal direction of the multi-core optical fiber.

Examples of a method of suppressing the measurement accuracy error due to the structural length difference between the central core along the longitudinal direction of the multi-core optical fiber as described above and the outer core helically formed include a method of providing a difference between the effective refractive index difference of the central core with respect to the cladding and the effective refractive index difference of the outer core with respect to the cladding. In this case, the difference is provided between the effective refractive index difference of the central core and the effective refractive index difference of the outer core so as to suppress a difference between the light propagation time through the central core and the light propagation time through the outer core for a unit length of the multi-core optical fiber Specifically, the effective refractive index difference of the outer core is set to be smaller compared with the effective refractive index difference of the central core, with respect to the cladding. The effective refractive index of the core depends on the relative refractive index difference of the core and the diameter of the core (core diameter). Therefore, in order to provide a difference in the effective refractive index of the core, it is conceivable to provide a difference in the relative refractive index difference and the diameter of each of cores to which the difference in the effective refractive index is to be provided.

In this manner, by providing a difference between the effective refractive index difference of the central core and the effective refractive index of the outer core, it would be possible to suppress the measurement accuracy error due to the structural length difference between the central core and the outer core. However, as a result of intensive studies by the present inventors, it has been found that a change in the environmental temperature leads to an occurrence of measurement accuracy error.

Subsequently, as a result of further intensive studies, the present inventors have found that the refractive index of the core has temperature dependence in some cases, and a change in the relationship between the effective refractive index of the central core and the effective refractive index of the outer core due to the environmental temperature change is the cause of the above-described measurement accuracy error.

SUMMARY

Accordingly, one or more embodiments of the present invention provide a multi-core optical fiber applicable as an optical fiber sensor capable of achieving high measurement accuracy even when the environmental temperature changes, and a method for manufacturing the multi-core optical fiber.

A multi-core optical fiber according to one or more embodiments of the present invention comprises: a central core formed at the center of cladding; and at least one outer core helically wound around the central core, in which when an average of a distance d between the central core and the outer core is $d_{ave}$, and the number of helical turns of the outer core per unit length is $f_w$, an effective refractive index $n_{e1}$ of the central core and an average $n_{e2ave}$ of effective refractive indices $n_{e2}$ of the outer cores satisfy the following Formula (1), and temperature dependence of the refractive index of the central core and temperature dependence of the average of the refractive indices of the outer cores are substantially the same.

$$n_{e1} \times \left(\frac{1}{fw} - B\right) < n_{e2ave} \times \left(\frac{1}{fw} + A\right) < n_{e1} \times \left(\frac{1}{fw} + B\right) \quad (1)$$

$$A = \sqrt{\left(\frac{1}{fw}\right)^2 + (2\pi d_{ave})^2} - \frac{1}{fw}$$

$$B = \frac{A}{1 + A \cdot fw}$$

As described above, in a case where the effective refractive index of the central core and the average effective refractive index of the outer core satisfy the above Formula (1), it is possible to reduce the average of the difference between the optical path length of the central core and the optical path length of the outer core as compared with the case where the central core and the outer core have the same effective refractive index. In addition, in a case where the effective refractive index of the central core and the average of the effective refractive indices of the outer cores satisfy the above Formula (1), it is possible to obtain a multi-core optical fiber having good tensile characteristics. Accordingly, using the multi-core optical fiber of the present invention as an optical fiber sensor makes it possible to achieve high measurement accuracy.

Moreover, the multi-core optical fiber of the present invention has temperature dependence substantially the same in the refractive index of the central core and the average of the refractive indices of the outer cores, and thus, it is possible to suppress a change in the relationship between the effective refractive index of the central core and the average of the effective refractive indices of the outer cores even when the temperature changes. Therefore, even when the environmental temperature changes, the central core and the outer cores can satisfy the above Formula (1).

Accordingly, using the multi-core optical fiber of the present invention as an optical fiber sensor makes it possible to achieve high measurement accuracy even when the environmental temperature changes. In general, when manufacturing a multi-core optical fiber having a helically shaped outer core, drawing is performed while rotating the base material to be the multi-core optical fiber, and thus, there is no need to average the number of helical turns $f_w$ since the number of helical turns $f_w$ is the same in the individual outer cores.

Furthermore, the type of dopant to be added to the central core and the type of dopant to be added to the outer core can be the same, and the concentration of the dopant to be added to the central core and an average of the concentrations of the dopants to be added to the outer cores can be substantially the same.

Satisfying such conditions leads to the state where temperature dependence of the effective refractive index of the central core and the temperature dependence of the average of the effective refractive indices of the outer cores are substantially the same. Therefore, when such conditions are satisfied, it is possible to achieve high measurement accuracy even when the environmental temperature changes in the use of the multi-core optical fiber of the present invention as an optical fiber sensor.

Furthermore, the dopant to be added to the central core and the outer core can be one type.

In a case where such a condition is satisfied, it is possible to easily make the temperature dependence of the effective refractive index of the central core and the temperature dependence of the average of the effective refractive indices of the outer cores substantially the same.

Furthermore, a difference $\delta\Delta_{ave}$ between a relative refractive index difference $\Delta_1$ of the central core with respect to the cladding and an average $\Delta_{2ave}$ of the relative refractive index differences $\Delta_2$ of the outer cores with respect to the cladding is –0.005% or more and 0.005% or less. That is, the condition that the concentration of the dopant to be added to the central core and the average of the concentrations of the dopants to be added to the outer cores are substantially the same includes the condition of adding the dopant such that the difference $\delta\Delta_{ave}$ is –0.005% or more and 0.005% or less.

Satisfying such a condition makes it possible to further suppress the change in the measurement accuracy even when the environmental temperature changes in the use of the multi-core optical fiber of the present invention as an optical fiber sensor.

Furthermore, the central core and the outer core are each provided with an FBG, and when a difference between a dispersion value $\lambda_1$ of the central core and an average value $\lambda_{2ave}$ of dispersion values $\lambda_2$ of the outer cores is $\Delta\lambda_{ave}$, and when a difference between a reflection wavelength $\lambda_{B1}$ of the central core due to the FBG and an average value $\lambda_{B2ave}$ of reflection wavelengths $\lambda_{B2}$ of the outer cores due to the FBG is $\Delta\lambda_{Bave}$, the difference $\delta\Delta_{ave}$ may satisfy the following Formula (2).

$$\delta\Delta_{ave} = 2.22\times10^{-2}\times\Delta\lambda_{ave} - 9.77\times10^{-5}\times\Delta\lambda_{Bave} + 8.66\times10^{-3} \quad (2)$$

Measuring the difference $\delta\Delta_{ave}$ between the relative refractive index difference $\Delta_1$ of the central core with respect to the cladding and the average $\Delta_{2ave}$ of the relative refractive index differences $\Delta_2$ of the outer cores with respect to the cladding is easier by measuring from the difference $\Delta\lambda_{ave}$ between the dispersion value $\lambda_1$ of the central core and the average value $\lambda_{2ave}$ of the dispersion values $\lambda_2$ of the outer cores and by measuring from the difference $\Delta\lambda_{Bave}$ between the reflection wavelength $\lambda_{B1}$ of the central core due to FBG and the average value $\lambda_{B2ave}$ of the reflection wavelengths $\lambda_{B2}$ of the outer cores due to FBG, rather than measuring from the core diameter and refractive index, or the like, of each of cores of the multi-core optical fiber. Therefore, it is possible to easily confirm whether the difference $\delta\Delta_{ave}$ is −0.005% or more and 0.005% or less by measurement of the Formula (2). Accordingly, it is possible to easily confirm whether the change in the measurement accuracy is successfully suppressed even when the environmental temperature changes in the use of the multi-core optical fiber of the present invention as an optical fiber sensor.

Furthermore, in a case where the diameter $D_1$ of the central core is 4.66 μm or more and 4.89 μm or less, the average $d_{ave}$ of the distance d between the central core and the outer core is 33 μm or more and 37 μm or less, and the number of helical turns $f_w$ of the outer core is 45 turns/m to 55 turns/m, $$\delta D_2 = \{(D_{2ave} - D_1)/D_1\} \times 100$$

$\delta D_2$ represented by the above Formula may be −2.19% or more and 0.52% or less. Note that, in the above formula, $D_{2ave}$ represents an average of the diameters $D_2$ of the outer cores.

Under the conditions that the diameter $D_1$ of the central core is 4.66 μm or more and 4.89 μm or less, the average $d_{ave}$ of the distance d between the central core and the outer core is 33 μm or more and 37 μm or less, and the number of helical turns $f_w$ of the outer core is 45 turns/m or more and 55 turns/m or less, and when the $\delta D_2$ falls within a range −2.19% or more and 0.52% or less, it is possible to achieve high measurement accuracy regardless of the change in environmental temperature even when the diameter $D_1$ of the central core differs from the average $D_{2ave}$ of the diameters $D_2$ of the outer cores.

Note that the diameter $D_1$ of the central core can be 4.695 μm or more and 4.825 μm or less. In a case where the diameter $D_1$ of the central core being 4.695 μm or more and 4.825 μm or less, it is possible to more easily achieve high measurement accuracy regardless of the change in environmental temperature even when the diameter $D_1$ of the central core differs from the average $D_{2ave}$ of the diameters $D_2$ of the outer cores.

Furthermore, one or more embodiments of the present invention provide a method for manufacturing a multi-core optical fiber including a central core formed in the center of cladding and at least one outer core helically wound around the central core. The method includes a preparation step, a measurement step, a first calculation step, a second calculation step, a selection step, and a drawing step. The preparation step prepares a core rod to be formed into the central core and the outer cores, and a cylindrical capillary having a uniform refractive index and being at least part of the cladding, the capillary having a central hole formed in the center in a radial direction and at least one outer hole formed around the central hole. The measurement step measures a refractive index profile in the longitudinal direction of the core rod. The first calculation step uses the refractive index profile of the core rod and the refractive index of the capillary to calculate: a profile of a dispersion value of an optical fiber in a case where the optical fiber is manufactured from a base material in which the core rod is surrounded by a glass body having the same refractive index as the capillary; and a profile of a reflection wavelength in a case where the FBGs are formed at predetermined intervals on the core of the optical fiber.

The second calculation step performs, in a case where a partial section of the core rod is formed into the central core and another partial section of the core rod is formed into the outer core to be the multi-core optical fiber, calculation of a difference $\Delta\lambda_{ave}$ between a dispersion value $\lambda_1$ of the central core and an average value $\lambda_{2ave}$ of a dispersion values $\lambda_2$ of the outer cores using the profile of the dispersion values calculated in the first calculation step, and calculation of a difference $\Delta\lambda_{Bave}$ between a reflection wavelength $\lambda_{B1}$ of the central core and an average value $\lambda_{B2ave}$ of reflection wavelengths $\lambda_{B2}$ of the outer cores using the profile of the reflection wavelength calculated in the first calculation step. The selection step uses the difference $\Delta\lambda_{ave}$ and the difference $\Delta\lambda_{Bave}$ and selects the section of the core rod to be formed into the central core and the section of the core rod to be formed into the outer cores such that the relative refractive index difference $\Delta_1$ of the section of the core rod to be formed into the central core with respect to the capillary is substantially the same as the relative refractive index difference $\Delta_2$ of the section of the core rod to be formed into the outer cores with respect to the capillary. The drawing step is performed after the arrangement step of arranging the section of the core rod selected as the central core in the central hole of the capillary and arranging another section of the core rod selected as the outer core in the outer hole of the capillary.

The drawing step draws the capillary in which individual sections of the core rod have been arranged, such that when an average of the distance d between the central core and the outer core is $d_{ave}$, and the number of helical turns of the outer core per unit length is $f_w$, the effective refractive index $n_{e1}$ of the central core and the average $n_{e2ave}$ of the effective refractive indices $n_{e2}$ of the outer cores satisfy the following Formula (3).

$$n_{e1} \times \left(\frac{1}{f_w} - B\right) < n_{e2ave} \times \left(\frac{1}{f_w} + A\right) < n_{e1} \times \left(\frac{1}{f_w} + B\right) \quad (3)$$

$$A = \sqrt{\left(\frac{1}{f_w}\right)^2 + (2\pi d_{ave})^2} - \frac{1}{f_w}$$

$$B = \frac{A}{1 + A \cdot f_w}$$

In order to manufacture a multi-core optical fiber in which temperature dependence of the refractive index of the central core and temperature dependence of the average of the refractive indices of the outer cores are substantially the same and satisfying the above Formula (1 the relative refractive index difference between the core rod to be formed into the central core and the core rod to be formed into the outer core is substantially the same. Thus, selecting a section of the core rod to be formed into the central core and the section of the core rod to be formed into the outer core from a single core rod would make it possible to achieve the relative refractive index difference substantially the same between the central core and the outer core. However, there occurs a refractive index profile even in a single core rod, and thus, the refractive index profile of the core rod is measured, and the above-described difference $\Delta\lambda_{ave}$ and the difference $\Delta\lambda_{Bave}$ are obtained from the measured refractive index profile. Thereafter the section of the core rod to be formed into the central core and the section of the core rod to be formed into the outer core are to be selected so that the relative refractive index difference $\Delta_1$ of the section of the core rod to be formed into the central core and the relative refractive index difference $\Delta_2$ of the section of the core rod to be formed into the outer core are substantially the same. In this manner, it is possible to manufacture a multi-core optical fiber in which the relative refractive index difference of the central core and the relative refractive index difference of the outer core are substantially the same.

In this case, the dopant to be added to the core rod can be one type.

Adding one type of dopant to the core rod would make it possible to set the profile of the relative refractive index difference in the longitudinal direction of the core rod to be closer to a constant value as compared with the case where a plurality of types of dopant is added to the core rod.

Furthermore, in the selection step, the section of the core rod to be formed into the central core and the section of the core rod to be formed into the outer core are to be selected such that a difference $\delta\Delta_{ave}$ between the relative refractive index difference $\Delta_1$ of the core rod to be formed into the central core with respect to the capillary and the average $\Delta_{2ave}$ of the relative refractive index differences $\Delta_2$ of the section of the core rod to be formed into the outer core with respect to the capillary is −0.005% or more and 0.005% or less.

Selecting the section of the core rod to be formed into the central core and the section of the core rod to be formed into the outer core in this manner makes it possible to manufacture a multi-core optical fiber that can be an optical fiber sensor capable of further suppressing the change in measurement accuracy even when the environmental temperature changes.

Furthermore, the difference $\delta\Delta_{ave}$ may be obtained using the following Formula (4).

$$\delta\Delta_{ave} = 2.22\times10^{-2}\times\Delta\lambda_{ave} - 9.77\times10^{-5}\times\Delta\lambda_{Bave} + 8.66\times10^{-3} \quad (4)$$

As described above, according to one or more embodiments of the present invention, it is possible to provide a multi-core optical fiber applicable as an optical fiber sensor capable of achieving high measurement accuracy even when the environmental temperature changes, and a method for manufacturing the multi-core optical fiber.

BRIEF DESCRIPTION OF DRAWINGS

FIG. 8 is a view illustrating a state of a drawing step.

DETAILED DESCRIPTION

Figure 1:
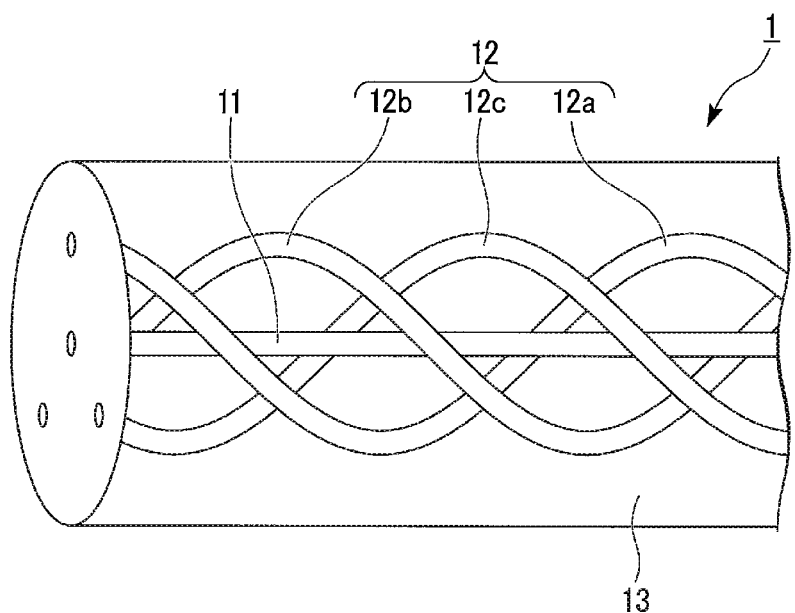
FIG. 1 is a perspective view illustrating a multi-core optical fiber according to an embodiment of the present invention.

Hereinafter, embodiments for implementing the multi-core optical fiber according to the present invention will be exemplified with a drawing. The embodiments exemplified below are intended to facilitate understanding of the present invention, and are not intended to limit the present invention. The present invention can be modified and improved from the following embodiments without departing from the scope and spirit of the present invention. In the drawings presented as reference below, the scale of each member might be changed in order to facilitate understanding.

<Configuration of Multi-Core Optical Fiber>

Figure 2:
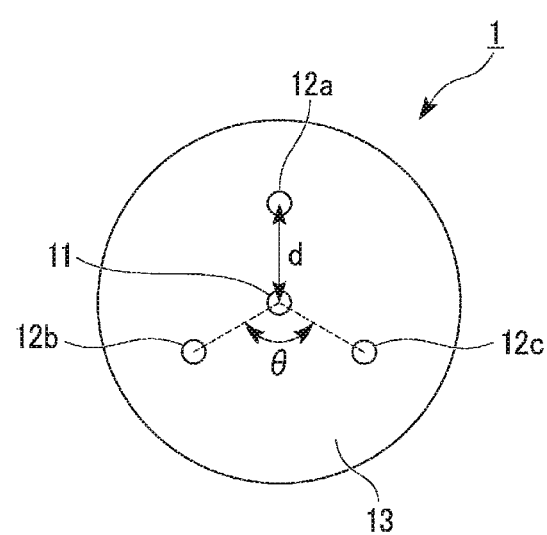
FIG. 2 is a cross-sectional view perpendicular to the longitudinal direction of the multi-core optical fiber illustrated in FIG. 1.

First, a configuration of a multi-core optical fiber will be described. FIG. 1 is a perspective view illustrating a multi-core optical fiber according to the present embodiment. FIG. 2 is a cross-sectional view perpendicular to the longitudinal direction of the multi-core optical fiber illustrated in FIG. 1. As illustrated in FIGS. 1 and 2, a multi-core optical fiber 1 of the present embodiment includes a central core 11, outer cores 12a to 12c, and cladding 13.

In the following description, the outer core 12 refers to any of the outer cores 12a to 12c. The outer peripheral surface of the cladding 13 may be covered with a coating layer (not illustrated).

The central core 11 is disposed at the center of the cladding 13. Accordingly, the central core 11 is disposed along an axis of the multi-core optical fiber 1. Therefore, when the multi-core optical fiber 1 is linearly arranged, the central core 11 forms a linear optical path. In the present embodiment, the central core 11 is formed of quartz glass containing germanium (Ge) and no other dopant. The central core 11 is provided with an FBG (not illustrated) formed over the entire length thereof. The core diameter, which is the diameter of the central core 11, is set to 5 to 7 [μm], for example.

Each of the outer cores 12a to 12c is a core formed so as to be helically wound around the central core 11. As illustrated in FIG. 2, each of the outer cores 12a to 12c is spaced apart from the central core 11 by a predetermined distance d and spaced apart from each other at a predetermined angle θ with respect to the center of the cladding 13 in a cross section orthogonal to the longitudinal direction. This distance d is also called a core pitch, being an inter-center pitch between the central core 11 and the outer core 12. The predetermined angle θ is, for example, 120° when the number of outer cores is three as in the present embodiment. That is, the outer cores 12a to 12c are helically wound around the central core 11 to extend in the longitudinal direction of the multi-core optical fiber 1 while maintaining the interval of the angle θ between each other. This allows the outer cores 12a to 12c to form three optical paths helically wound around the central core 11. Note that the outer cores 12a to 12c are wound around the central core 11 with the same number of helical turns per unit length of the multi-core optical fiber 1.

Similarly to the central core 11, the outer cores 12a to 12c are formed of quartz glass containing germanium and no other dopant. That is, in the multi-core optical fiber 1 of the present embodiment, the dopant added to the central core 11 and the outer core 12 is one type, that is, germanium alone. In the present embodiment, germanium having substantially the same concentration is added to each of the central core 11 and the outer cores 12a to 12c. Details of the germanium concentration will be described below. In addition, FBGs (not illustrated) are formed over the entire length of each of the outer cores 12a to 12c.

The distance d between the central core 11 and the outer core 12 is set in consideration of crosstalk between the cores, the optical path length difference between the central core 11 and the outer core 12, and a strain amount in the central core 11 and the outer core 12 when the multi-core optical fiber 1 is bent, or the like. For example, the distance between the central core 11 and the outer core 12 is set to approximately 35 μm, for example, and the number of helical turns of the outer core 12 per unit length is set to approximately 50 turns/m, for example. In this case, the multi-core optical fiber is suitable for use as an optical fiber sensor that measures the shape of a structure or the like to which the multi-core optical fiber is attached. Note that the number of helical turns in this case is the number of times that the outer core 12 helically turns around the central core 11.

The cladding 13 covers the periphery of the central core 11 and the outer cores 12a to 12c, having a circular or elliptical cross-sectional outer shape. That is, the central core 11 and the outer cores 12a to 12c are covered with the common cladding 13. The cladding 13 is formed of quartz glass to which no dopant is added, for example.

<Effective Refractive Index of Cores>

Figure 3:
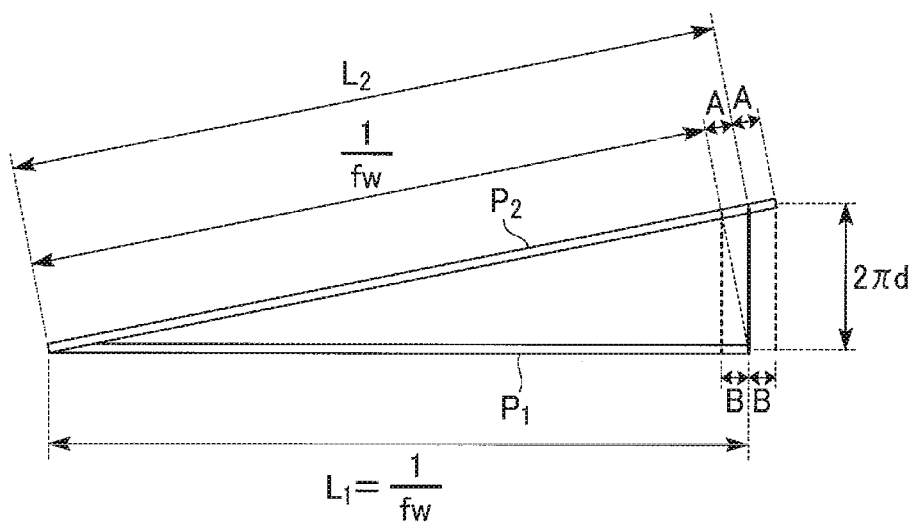
FIG. 3 is a view illustrating an optical path length difference between a central core and an outer core.

Next, effective refractive index of each of the central core 11 and the outer core 12 will be described. FIG. 3 is a view illustrating an optical path length difference between the central core 11 and the outer core 12 according to the present embodiment. In the following description, the core pitch between the central core 11 and the outer core 12 of the multi-core optical fiber 1 is defined as d, and the number of helical turns of the outer core 12 per unit length of the multi-core optical fiber 1 is defined as $f_w$.

In FIG. 3, the straight line denoted by reference numeral P1 represents the central core 11, while the straight line denoted by reference numeral P2 represents the outer core 12. Note that FIG. 3 illustrates the central core 11 and one outer core 12 alone corresponding to one helical period of the outer core 12. In the section corresponding to one helical period of the outer core 12 in the multi-core optical fiber 1, when the structural length of the central core 11 is $L_1$ and the structural length of the outer core 12 is $L_2$, then, the relationship between these lengths are represented by Formula (5).

$$L_2 = \sqrt{L_1^2 + (2\pi d)^2} \quad (5)$$

In a case where the central core 11 and the outer core 12 have the same effective refractive index, the optical path length of the central core 11 is proportional to the length $L_1$ and the optical path length of the outer core 12 is proportional to the length $L_2$ with a factor of proportionality based on the effective refractive index. Therefore, when the central core 11 and the outer core 12 have the same effective refractive index, the optical path length of the outer core 12 is longer than the optical path length of the central core 11. Here, when the difference between the length $L_1$ of the central core 11 and the length $L_2$ of the outer core 12 in the section corresponding to one helical period of the outer core 12 in the multi-core optical fiber 1 is A, then, $A = L_2 - L_1$ is established. As described above, the number of helical turns of the outer cores 12a to 12c per unit length of the multi-core optical fiber 1 is $f_w$. Therefore, the structural length difference A between the central core 11 and the outer core 12 is expressed by the following Formula (6).

$$A = \sqrt{\left(\frac{1}{f_w}\right)^2 + (2\pi d_{ave})^2} - \frac{1}{f_w} \quad (6)$$

The outer core 12 is longer than the central core 11 by the difference A described above. Therefore, a length B of the central core 11 corresponding to the length difference A along the outer core 12 represented by the above Formula (6), in other words, the length B along the central core 11 corresponding to the case of proceeding along the outer core 12 by the length difference A is represented by the following Formula (7).

$$B = \frac{A}{1 + A \cdot f_w} \quad (7)$$

Here, the effective refractive index of the central core 11 is defined as $n_{e1}$, and the effective refractive index of the outer core 12 is defined as $n_{e2}$. When these effective refractive indices $n_{e1}$ and $n_{e2}$ satisfy the following Formula (8), the optical path length difference between the central core 11 and the outer core 12 is smaller than the optical path length difference in a case where the central core 11 and the outer core 12 have the same effective refractive index. That is, when the effective refractive index $n_{e1}$ of the central core 11 and the effective refractive index $n_{e2}$ of the outer core 12 satisfy the following Formula (8), it is possible to reduce the difference between the optical path length of the central core 11 and the optical path length of the outer core 12 as compared with the case where the central core 11 and the outer core 12 have the same effective refractive index. Furthermore, when the effective refractive index $n_{e1}$ and the effective refractive index $n_{e2}$ satisfy the above Formula (8), a multi-core optical fiber having good tensile characteristics can be obtained. As a result, high measurement accuracy can be achieved when the multi-core optical fiber 1 is used as an optical fiber sensor.

$$n_{e1} \times \left(\frac{1}{f_w} - B\right) < n_{e2} \times \left(\frac{1}{f_w} + A\right) < n_{e1} \times \left(\frac{1}{f_w} + B\right) \quad (8)$$

Therefore, all the outer cores 12a to 12c can satisfy the above Formula (8). Note that when the average of the parameters of the outer cores 12a to 12c satisfies the above Formula, it is still possible to achieve high measurement accuracy as described above at the time of using the multi-core optical fiber 1 as an optical fiber sensor. Specifically, when the average of the distance d between the central core 11 and each of the outer cores 12a to 12c is $d_{ave}$, it would be satisfactory as long as the effective refractive index $n_{e1}$ of the central core 11 and the average $n_{e2ave}$ of the effective refractive indices $n_{e2}$ of the outer cores 12a to 12c satisfy the above Formula (8). That is, it is satisfactory as long as the multi-core optical fiber 1 satisfies the Formula in which the distance d is replaced with the average $d_{ave}$ and the effective refractive index $n_{e2}$ is replaced with the average $n_{e2ave}$ in the above Formulas (6) to (8). Therefore, it is satisfactory as long as the following Formula (9) is satisfied. Note that, as described above, the number of helical turns of the outer core 12 per unit length of the multi-core optical fiber 1 is the same in each of the outer cores 12, and therefore the number does not need to be averaged, and it is allowable to use $f_w$. This Formula (9) is similar to the above Formula (1).

$$n_{e1} \times \left(\frac{1}{fw} - B\right) < n_{e2ave} \times \left(\frac{1}{fw} + A\right) < n_{e1} \times \left(\frac{1}{fw} + B\right) \quad (9)$$

$$A = \sqrt{\left(\frac{1}{fw}\right)^2 + (2\pi d_{ave})^2} - \frac{1}{fw}$$

$$B = \frac{A}{1 + A \cdot fw}$$

Next, FBGs formed in the central core 11 and the outer core 12 will be described. The FBG is generally formed by light emission from the side of an optical fiber. Therefore, the FBG formed on the central core 11 and the FBG formed on the outer core 12 are formed with the same period in a direction along the longitudinal direction of the multi-core optical fiber 1. However, as described above, the outer core 12 is formed so as to be helically wound around the central core 11. Therefore, when the central core 11 and the outer core 12 have the same effective refractive index as described above, the optical path length of the outer core 12 is longer than the optical path length of the central core 11.

Accordingly, the period of the FBG formed on the outer core 12 along the outer core 12 is longer than the period of the FBG formed on the central core 11 along the central core 11. Therefore, when the Bragg wavelength of the FBG formed in the central core 11 is $\lambda_{B1}$, and the Bragg wavelength of the FBG formed in the outer core 12 is $\lambda_{B2}$, then, the relationship of these is expressed by the following Formula (10).

$$\lambda_{B2} = \frac{\sqrt{L_1^2 + (2\pi d)^2}}{L_1} \lambda_{B1} \quad (10)$$

The reflection wavelength $\lambda_B$, which is the Bragg wavelength of FBG, is given by the following Formula (11), where $\Lambda$ is the length of one period of the periodic structure of the refractive index variation formed in the multi-core optical fiber 1, and $n_e$ is the effective refractive index.

$$\lambda_B = 2n_e \Lambda \quad (11)$$

Therefore, in a case where the ratio between the effective refractive index $n_{e1}$ of the central core 11 and the effective refractive index $n_{e2}$ of the outer core 12 satisfies the following Formula (12), it is possible to match the optical path length of the central core 11 with the optical path length of the outer core 12. In other words, the effective refractive index $n_{e2}$ of the outer core 12 can be set to be lower than the effective refractive index $n_{e1}$ of the central core 11 so that the optical path length of the central core 11 and the optical path length of the outer core 12 match. With this setting, the Bragg wavelength difference between the central core 11 and the outer core 12 can be made zero. Accordingly, the each of the outer cores 12a to 12c can satisfy the following Formula (12).

$$\frac{n_{e2}}{n_{e1}} = \frac{\left(\frac{1}{fw}\right)}{\sqrt{\left(\frac{1}{fw}\right)^2 + (2\pi d)^2}} \quad (12)$$

Even when the above Formula (12) is not satisfied, the Bragg wavelength difference can be further suppressed when the above Formula (8) is satisfied. As a result, high measurement accuracy can be achieved when the multi-core optical fiber 1 is used as an optical fiber sensor.

In addition, when the average of the outer cores 12a to 12c for each of parameters satisfies the above Formula (12), high measurement accuracy can be achieved when the multi-core optical fiber 1 is used as an optical fiber sensor. Therefore, it is satisfactory as long as the following Formula (13) is satisfied.

$$\frac{n_{e2ave}}{n_{e1}} = \frac{\left(\frac{1}{fw}\right)}{\sqrt{\left(\frac{1}{fw}\right)^2 + (2\pi d_{ave})^2}} \quad (13)$$

Even when the above Formula (13) is not satisfied, the Bragg wavelength difference between the central core 11 and the outer core 12 can be suppressed when the above Formula (9) is satisfied.

Even when the relative refractive index difference Oi of the central core 11 with respect to the cladding 13 is same as the relative refractive index difference $\Delta_2$ of the outer core 12 with respect to the cladding 13, adjusting the ratio of the diameters of the central core 11 and the outer core 12 (core diameters) would be able to satisfy the conditions of the above Formulas (8), (9), and (12).

<Influence of Temperature>

Next, the influence of temperature will be described. As described above, germanium is added to the central core 11 and the outer cores 12a to 12c as a dopant for increasing the refractive index. The refractive index of the core varies in accordance with a change in the concentration of the germanium to be added. Meanwhile, the refractive index of quartz to which germanium is added varies in accordance with a change in temperature. Furthermore, the amount of variation in the refractive index when there is a change in temperature would change in accordance with the change in the concentration of the germanium to be added. That is, the temperature dependence of the refractive index changes in accordance with the change in the concentration of germanium to be added.

The effective refractive index $n_e$ depends on the relative refractive index difference $\Delta$ of the core with respect to the cladding. Therefore, as illustrated in the above Formulas (8), (12), or the like, when the effective refractive index $n_{e1}$ of the central core 11 and the effective refractive index $n_{e2}$ of the outer core 12 are set to have a predetermined ratio, it is conceivable to set the concentration of the germanium to be added to the central core 11 and the concentration of germanium to be added to the outer core 12 to have a predetermined ratio so as to set the relative refractive index difference $\Delta_1$ of the central core 11 with respect to the cladding 13 and the relative refractive index difference $\Delta_2$ of the outer core 12 with respect to the cladding 13 to have a predetermined ratio. However, setting the concentration of germanium added to the central core 11 and the concentration of germanium added to the outer core 12 to be different from each other in this manner would result in a difference between the temperature dependence of the refractive index of the central core 11 and the temperature dependence of the refractive index of the outer core 12. For this reason, even when either of the above Formulas (8) and (12) is satisfied at a specific temperature, there is a concern that the Formula might not be satisfied when the environmental temperature changes, leading to a concern of deterioration in measurement accuracy in the use of the multi-core optical fiber 1 as an optical fiber sensor.

To overcome this, the germanium added to the central core 11 and the germanium added to the outer core 12 are to be set to have substantially the same concentration. Specifically, the germanium to be added to the central core 11 and the germanium to be added to the outer core 12 are set to have substantially the same concentration to such an extent that the multi-core optical fiber 1 satisfies the above Formula (8) even when the environmental temperature changes. In this manner, adding germanium to the central core 11 and the outer core 12 sets the relative refractive index difference $\Delta_1$ of the central core 11 with respect to the cladding 13 and the relative refractive index difference $\Delta_2$ of the outer core 12 with respect to the cladding 13 to be substantially the same, making it possible to set the temperature dependence of the refractive index of the central core 11 and the temperature dependence of the refractive index of the outer core 12 to be substantially the same. The range in which the relative refractive index difference $\Delta_1$ of the central core 11 with respect to the cladding 13 and the relative refractive index difference $\Delta_2$ of the outer core 12 with respect to the cladding 13 is substantially the same can be set, for example, to a range in which a difference $\delta\Delta$ between the relative refractive index difference $\Delta_1$ and the relative refractive index difference $\Delta_2$ is $-0.005\%$ or more and $0.005\%$ or less. Within such a range, the measurement error can be reduced even when the multi-core optical fiber 1 is used as an optical fiber sensor as will be described later. Note that when the germanium to be added to the central core 11 and the germanium to be added to the outer core 12 have substantially the same concentration, adjusting the ratio between a diameter $R_1$ of the central core 11 and a diameter $R_2$ of the outer core 12 enables the multi-core optical fiber 1 to satisfy the Formula (8).

In a case where germanium alone is added to the central core 11 and the outer core 12 as described in the present embodiment, and when the relative refractive index difference $\Delta_1$ of the central core 11 with respect to the cladding 13 and the relative refractive index difference $\Delta_2$ of the outer core 12 with respect to the cladding 13 are substantially the same, that is, when the difference $\delta\Delta$ obtained by subtracting the relative refractive index difference $\Delta_1$ from the relative refractive index difference $\Delta_2$ is substantially zero, it is possible to make the temperature dependence of the refractive index of the central core 11 and the temperature dependence of the refractive index of the outer core 12 substantially the same. However, it is difficult to measure the relative refractive index difference of the cores of the optical fiber with such high accuracy as to be able to determine whether the relative refractive index difference $\Delta_1$ and the relative refractive index difference $\Delta_2$ are substantially the same. To handle this, the difference $\delta\Delta$ of the relative refractive index differences is obtained by using a difference $D\Delta$ between a dispersion value $\lambda_1$ of the central core 11 and a dispersion value $\lambda_2$ of the outer core 12, and using a difference $\Delta\lambda_B$ between the reflection wavelength $\lambda_{B1}$ due to the FBG formed in the central core 11 and the reflection wavelength $\lambda_{B2}$ due to the FBG formed in the outer core 12.

Furthermore, as described above, the parameters of the outer core 12 can be considered as an average of the individual outer cores 12a to 12c. Accordingly, FIG. 4 is established when the difference between the dispersion value $\lambda_1$ of the central core 11 and an average value $\lambda_{2ave}$ of the dispersion values $\lambda_2$ of the outer cores 12a to 12c is $\Delta\lambda_{ave}$, the difference between the reflection wavelength $\lambda_{B1}$ of the central core 11 due to the FBG and an average value $\lambda_{B2ave}$ of the reflection wavelengths $\lambda_{B2}$ of the outer cores 12a to 12c due to the FBG is $\Delta\lambda_{Bave}$, the average of the relative refractive index differences $\Delta_2$ of the outer cores 12a to 12c with respect to the cladding 13 is $\Delta_{2ave}$, and the difference between the relative refractive index difference $\Delta_1$ and the average $\Delta_{2ave}$ of the relative refractive index difference $\Delta_2$ is $\delta\Delta_{ave}$.

Figure 4:
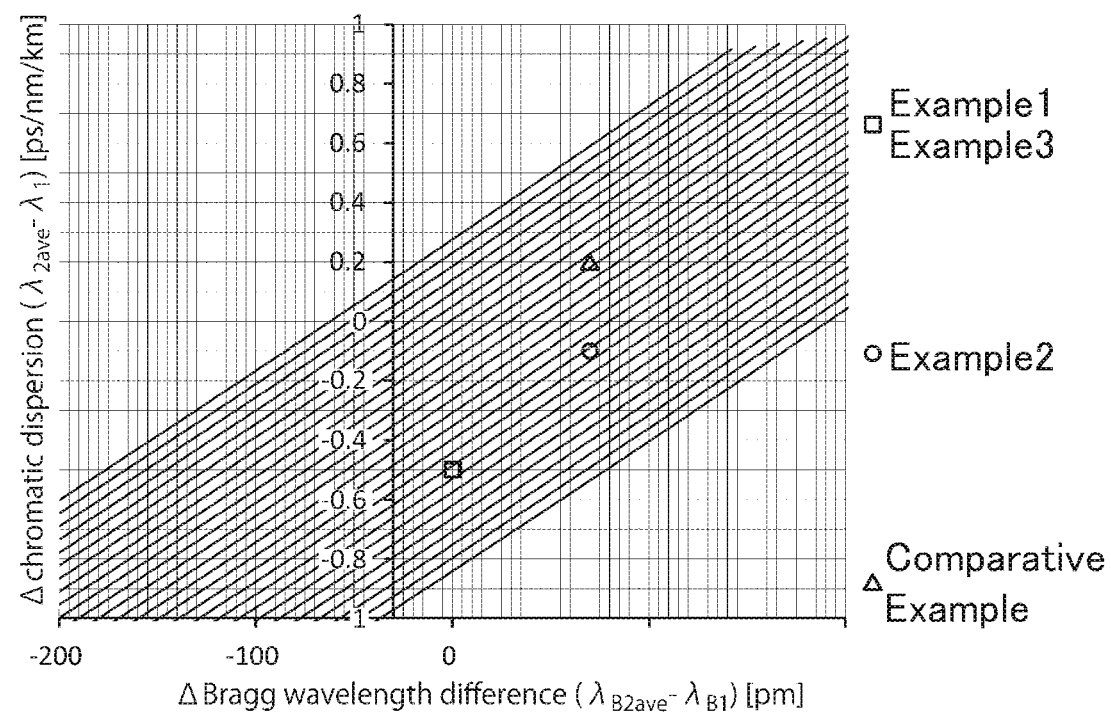
FIG. 4 is a diagram illustrating a relationship of a difference $\Delta\lambda_{ave}$ between a dispersion value $\lambda_1$ of the central core and an average value $\lambda_{2ave}$ of the dispersion values $\lambda_2$ of the outer cores, with a difference $\Delta\lambda_{Bave}$ between a reflection wavelength $\lambda_{B1}$ due to an FBG formed in the central core and an average value $\lambda_{B2ave}$ of reflection wavelengths $\lambda_{B2}$ due to an FBG formed in the outer cores.

FIG. 4 is a diagram illustrating a relationship of the difference $\Delta\lambda_{ave}$ (that is, ($\lambda_{2ave}-\lambda_1$)) between the dispersion value $\lambda_1$ of the central core 11 and the average value $\lambda_{2ave}$ of the dispersion values $\lambda_2$ of the outer core 12, with the difference $\Delta\lambda_{Bave}$ (that is, ($\lambda_{B2ave}-\lambda_{B1}$)) between the reflection wavelength $\lambda_{B1}$ due to the FBG formed in the central core 11 and the average value $\lambda_{B2ave}$ of reflection wavelengths $\lambda_{B2}$ due to an FBG formed in the outer core 12. FIG. 4 illustrates this relationship, for each of the differences $\delta\Delta_{ave}$ between the relative refractive index difference $\Delta_1$ of the central core 11 with respect to the cladding 13 and the average $\Delta_{2ave}$ of the refractive index differences $\Delta_2$ of the outer core 12 with respect to the cladding 13, at a 0.001% pitch in the range of the difference $\delta\Delta_{ave}$ from $-0.010\%$ to $0.015\%$. In FIG. 4, the lowermost line illustrates the relationship between the difference $\Delta\lambda_{ave}$ and the difference $\Delta\lambda_{Bave}$ when the difference $\delta\Delta_{ave}$ is at $-0.010\%$. When one line is shifted upward from this line, the difference $\delta\Delta_{ave}$ increases by 0.001%. The uppermost line illustrates the relationship between the difference $\Delta\lambda_{ave}$ and the difference $\Delta\lambda_{Bave}$ when the difference $\delta\Delta_{ave}$ of the relative refractive index differences is at 0.015%.

Specifically, the difference $\delta\Delta_{ave}$ in the relative refractive index differences can be expressed by the following Formula (14) using the difference $\Delta\lambda_{ave}$ in the dispersion values obtained by subtracting the dispersion value $\lambda_1$ of the central core 11 from the average value $\lambda_{2ave}$ of the dispersion values $\lambda_2$ of the outer cores 12, and using the difference $\Delta\lambda_{Bave}$ in reflection wavelengths obtained by subtracting the reflection wavelength $\lambda_{B1}$ due to the FBG formed in the central core 11 from the average value $\lambda_{B2ave}$ of the reflection wavelengths $\lambda_{B2}$ due to the FBG formed in the outer core 12. Formula (14) was calculated by performing multiple regression analysis using a relational expression of the dispersion difference and the Bragg wavelength difference in each of solid lines illustrating the relationship between the difference $\Delta\lambda_{ave}$ and the difference $\Delta\lambda_{Bave}$ in FIG. 4. FIG. 4 illustrates the relationship between the dispersion value difference $\Delta\lambda_{ave}$ and the reflection wavelength difference $\Delta\lambda_{Bave}$ satisfying the following Formula (14), for each of relative refractive index differences $\delta\Delta_{ave}$. This Formula (14) is similar to the above Formula (2). This formula was obtained for a case where the core pitch is 35 μm and the number of helical turns of the outer core 12 is 50 times/m.

$$\delta\Delta_{ave}=2.22\times 10^{-2}\times\Delta\lambda_{ave}-9.77\times 10^{-5}\times\Delta\lambda_{Bave}+8.66\times 10^{-3} \qquad (14)$$

As described above, the range in which the relative refractive index difference $\Delta_1$ of the central core 11 and the average $\Delta_{2ave}$ of the relative refractive index difference $\Delta_2$ of the outer core 12 are substantially the same is set to a range, for example, in which the difference $\delta\Delta_{ave}$ between the relative refractive index difference $\Delta_1$ and the average $\Delta_{2ave}$ of the relative refractive index difference $\Delta_2$ is −0.005% or more and 0.005% or less. Therefore, when germanium alone is added to the central core 11 and the outer core 12 as described in the present embodiment, and the following Formula (15) is satisfied, the relative refractive index difference $\Delta_1$ of the central core 11 with respect to the cladding 13 and the average $\Delta_{2ave}$ of the relative refractive index differences $\Delta_2$ of the outer cores 12 with respect to the cladding 13 is substantially the same.

$$-0.005 \leq 2.22 \times 10^{-2} \times \Delta\lambda_{ave} - 9.77 \times 10^{-5} \Delta\lambda_{Bave} + 8.66 \times 10^{-3} \leq 0.005 \quad (15)$$

In FIG. 4, the parameters of the outer core 12 are considered as the average of the individual outer cores 12a to 12c. The following Formula (16) is established to indicate a relationship among the difference $\Delta\lambda$ between the dispersion value $\lambda_1$ of the central core 11 and the dispersion value $\lambda_2$ of the outer core 12, the difference $\Delta\lambda_B$ between the reflection wavelength $\lambda_{B1}$ of the central core 11 due to the FBG and the reflection wavelength $\lambda_{B2}$ of the outer core 12 due to the FBG, the relative refractive index difference $\Delta_2$ of each of the outer cores 12 with respect to the cladding 13, and the difference $\delta\Delta$ between the relative refractive index difference $\Delta_1$ and the relative refractive index difference $\Delta_2$.

$$\delta\Delta = 2.22 \times 10^{-2} \times \Delta\lambda - 9.77 \times 10^{-5} \times \Delta\lambda_B + 8.66 \times 10^{-3} \quad (16)$$

Accordingly, the above Formula (15) leads to the following Formula (17), and the central core 11 and the each of the outer cores 12a to 12c can satisfy the following Formula (17).

$$-0.005 \leq 2.22 \times 10^{-2} \times \Delta\lambda - 9.77 \times 10^{-5} \times \Delta\lambda_B + 8.66 \times 10^{-3} \leq 0.005 \quad (17)$$

As described above, in a case where the central core 11 and the outer core 12 satisfy the above Formula (9) as described above, the multi-core optical fiber 1 according to the present invention can reduce the difference between the optical path length of the central core 11 and the optical path length of the outer core 12 as compared with the case where the effective refractive index $n_{e1}$ of the central core 11 and the effective refractive index $n_{e2}$ of the outer core 12 are the same. Furthermore, in a case where the effective refractive index $n_{e1}$ and the effective refractive index $n_{e2}$ satisfy the above Formula (9), the fiber can be a multi-core optical fiber that exhibits a good tensile characteristics range. Accordingly, using the multi-core optical fiber 1 of the present embodiment as an optical fiber sensor makes it possible to achieve high measurement accuracy. Furthermore, the multi-core optical fiber 1 according to the present embodiment is characterized in that the temperature dependence of the refractive index of the central core 11 and the temperature dependence of the refractive index of the outer core 12 are substantially the same. Accordingly, the relationship between the effective refractive index $n_{e1}$ of the central core 11 and the average $n_{e2ave}$ of the effective refractive indices $n_{e2}$ of the outer cores 12 does not substantially change even when the temperature changes.

Therefore, even when the environmental temperature changes, the central core 11 and the outer core 12 can satisfy the relationship of the above Formula (9). Accordingly, using the multi-core optical fiber 1 of the present invention as an optical fiber sensor makes it possible to achieve high measurement accuracy even when the environmental temperature changes.

Moreover, in the present embodiment, one type of germanium is added to the central core 11 and the outer core 12 as a dopant. As described above, making the concentration of germanium to be added to the central core 11 and the average concentration of germanium to be added to the outer core 12 substantially the same makes it possible to easily make the temperature dependence of the effective refractive index $n_{e1}$ of the central core 11 and the temperature dependence of the average $n_{e2ave}$ of the effective refractive indices $n_{e2}$ of the outer cores 12 substantially the same.

Note that in the present embodiment, germanium is added to the central core 11 and the outer core 12 as one type of dopant. Alternatively, a dopant other than germanium may be added to the central core 11 and the outer core 12, or another dopant may be added without adding germanium. Still, the type of dopant to be added to the central core 11 and the type of dopant to be added to the outer core 12 can be the same, and the concentration of the dopant to be added to the central core 11 and an average concentration of the dopant to be added to the outer cores 12 can be substantially the same. Satisfying such conditions leads to the state where temperature dependence of the effective refractive index $n_{e1}$ of the central core 11 and the temperature dependence of the average $n_{e2ave}$ of the effective refractive indices $n_{e2}$ of the outer cores 12 are substantially the same. Furthermore, in this case, the concentration of the dopant to be added to the central core 11 and the concentration of the dopant to be added to each of the outer cores 12 are substantially the same. However, a dopant that does not affect the temperature dependence may be added.

<Method for Manufacturing Multi-Core Optical Fiber>

Next, the manufacturing method of the multi-core optical fiber described above will be described.

Figure 5:
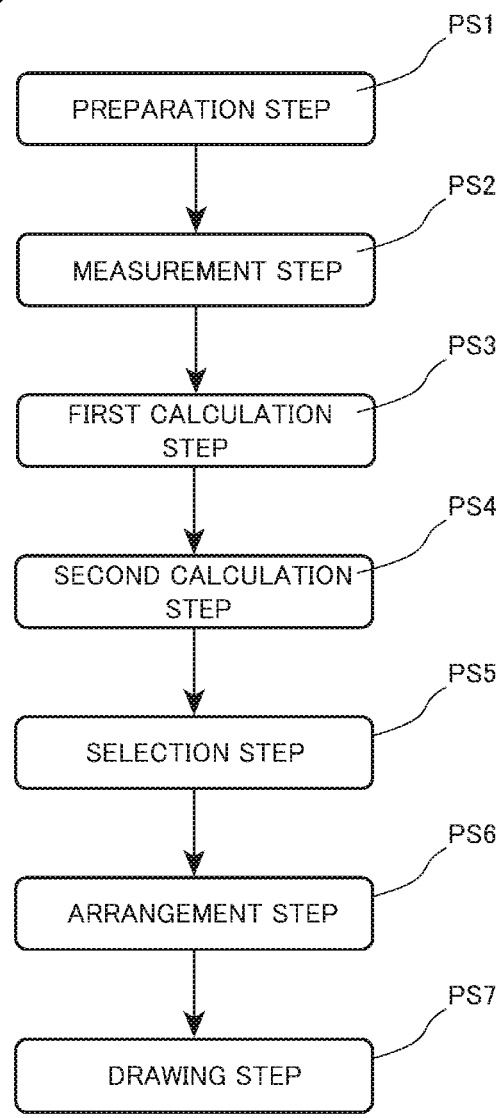
FIG. 5 is a flowchart illustrating a method for manufacturing the multi-core optical fiber illustrated in FIG. 1.

FIG. 5 is a flowchart illustrating a method for manufacturing the optical fiber sensor according to the present embodiment. The method for manufacturing the multi-core optical fiber according to the present embodiment includes a preparation step PS1, a measurement step PS2, a first calculation step PS3, a second calculation step PS4, a selection step PS5, an arrangement step PS6, and a drawing step PS7.

(Preparation Step PS1)

Figure 6:
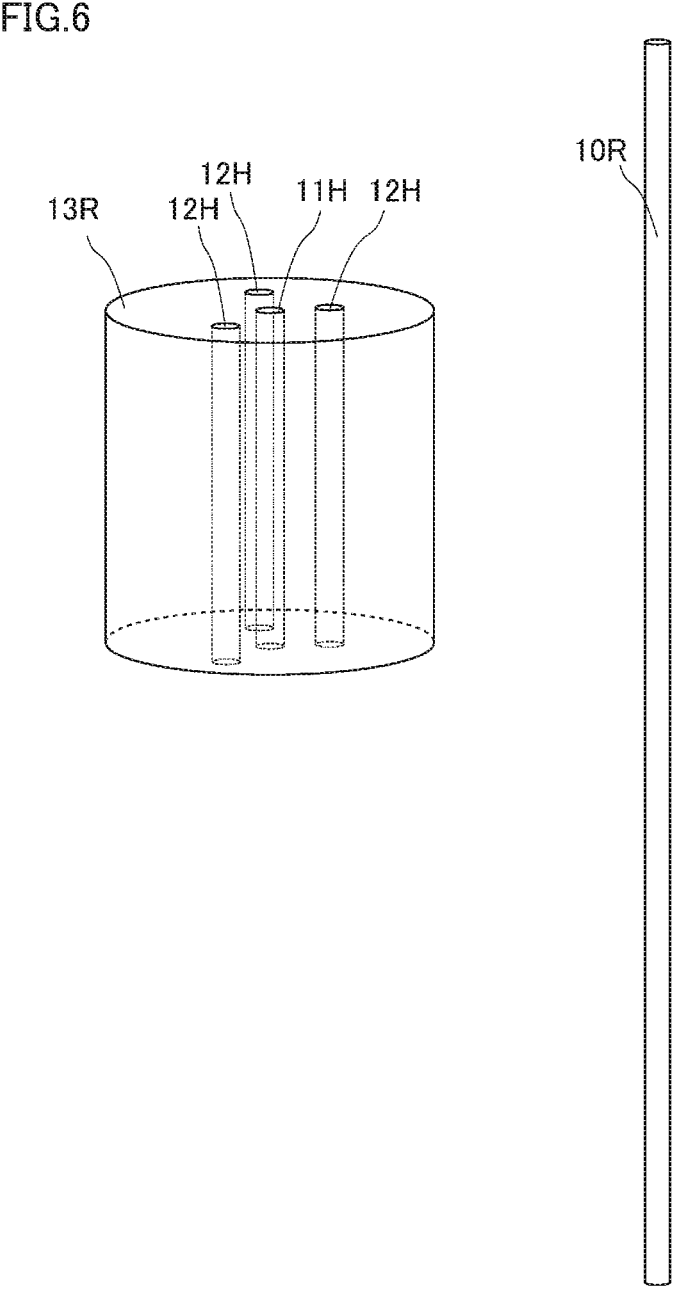
FIG. 6 is a view illustrating a state of a preparation step.

The present step is a step that prepares a core rod 10R to be formed into the central core 11 and the outer core 12, and a cylindrical capillary 13R having a uniform refractive index and being at least part of the cladding 13, the capillary 13R having a central hole 11H formed in the center in the radial direction and at least one outer hole 12H formed around the central hole 11H. FIG. 6 is a view illustrating the core rod 10R and the capillary 13R prepared in the present step. The core rod 10R is a glass body to be formed into the central core 11 and the outer core 12. Therefore, as illustrated in FIG. 6, germanium is added to the core rod 10R, and the length of the core rod 10R is set to be longer than the sum of the length of the base material for the central core 11 and the length of the base material for the outer core 12. The capillary 13R is a cylindrical glass body having a uniform refractive index and that is formed into at least part of the cladding 13. The capillary 13R has a central hole 11H formed at the center in the radial direction and at least one outer hole 12H formed around the central hole 11H. In the present embodiment, since the multi-core optical fiber 1 has three outer cores 12a to 12c, three outer holes 12H are also formed.

(Measurement Step PS2)

The concentration of germanium added to the core rod 10R tends to slightly change in the longitudinal direction due to manufacturing errors or the like. Therefore, the present step is a step of measuring the refractive index profile in the longitudinal direction of the core rod 10R. For example, a preform analyzer can be used for this measurement. The refractive index profile in the longitudinal direction of the core rod 10R can be measured at pitch of 5 mm to 20 mm, for example.

(First Calculation Step PS3)

The present step is a step that uses the refractive index profile of the core rod 10R and the refractive index of the capillary 13R and calculates the profile of the dispersion value of an optical fiber in a case where the optical fiber is manufactured from a base material in which the core rod 10R is surrounded by a glass body having the same refractive index as in the capillary 13R and calculates the profile of the reflection wavelength in a case where FBGs are formed at predetermined intervals on the core of the optical fiber.

The present step first assumes an optical fiber that uses the core rod 10R that is to be formed into a core using the refractive index profile of the core rod 10R measured in the measurement step PS2, and in which the core is surrounded by cladding having the same refractive index as that of the capillary. The refractive index profile of the core of the optical fiber is a profile obtained by extending the refractive index profile of the core rod 10R in the longitudinal direction. Furthermore, the diameter of the core of the optical fiber is defined as the diameter of the central core 11 in the multi-core optical fiber 1. Subsequently, a propagation constant β can be calculated from the core diameter, the relative refractive index difference of the core with respect to the cladding, and a wavelength λ. Since a dispersion value $\lambda_0$ of the optical fiber is calculated by differentiating the propagation constant β with the wavelength as illustrated in the following Formula (18), the propagation constant at each of wavelengths is calculated from the refractive index profile of the core rod and numerically differentiated so as to calculate wavelength dispersion. Note that c is the speed of light in the following Formula (18).

$$\lambda_0 = \frac{\lambda}{\pi c}\left(\frac{\lambda}{2}\frac{d^2\beta}{d\lambda^2} + \frac{d\beta}{d\lambda}\right) \qquad (18)$$

The relative refractive index difference Δ and the core diameter are variables based on the refractive index profile of the core. Accordingly, the dispersion value $\lambda_0$ varies depending on the section of the optical fiber. In this manner, the profile of dispersion values when the core rod 10R is used as an optical fiber is obtained.

Furthermore, the profile of the reflection wavelength when the FBGs are formed at predetermined intervals on the optical fiber is obtained. When Λ is the length of one period of the periodic structure of FBG formed in the optical fiber and $n_e$ is the effective refractive index, the reflection wavelength $\lambda_B$, which is the Bragg wavelength, is given by Formula (11) as above.

The effective refractive index $n_e$ varies with a change in the relative refractive index difference Δ and a change in the core diameter. As described above, the relative refractive index difference Δ and the core diameter are variables depending on the refractive index profile of the core. Accordingly, the reflection wavelength $\lambda_B$ varies depending on the section of the optical fiber. In this manner, the profile of reflection wavelengths when the core rod 10R is used as an optical fiber is obtained.

(Second Calculation Step PS4)

The present step is a step that performs, in a case where a partial section of the core rod 10R is formed into the central core 11 and another partial section of the core rod 10R is formed into the outer cores 12a to 12c to be the multi-core optical fiber 1, calculation of a difference $\Delta\lambda_{ave}$ between the dispersion value $\lambda_1$ of the central core 11 and the average value $\lambda_{2ave}$ of the dispersion values $\lambda_2$ of the outer cores 12a to 12c using the profile of the dispersion values $\lambda_0$ calculated in the first calculation step PS3 and calculation of the difference $\Delta\lambda_{Bave}$ between the reflection wavelength $\lambda_{B1}$ of the central core 11 and the average value $\lambda_{B2ave}$ of the reflection wavelengths $\lambda_{B2}$ of the outer cores 12a to 12c using the profile of the reflection wavelength $\lambda_B$ calculated in the first calculation step PS3.

As described above, since the refractive index of the core rod 10R tends to vary in the longitudinal direction, the dispersion values $\lambda_2$ of the outer cores 12a to 12c in a case where a partial section of the core rod 10R is formed into the central core 11 and another partial section of the core rod 10R is formed into the outer cores 12a to 12c to be the multi-core optical fiber 1 tend to vary from each other in each of the outer cores 12, and the dispersion value $\lambda_1$ of the central core 11 and the dispersion values $\lambda_2$ of the outer cores 12a to 12c tend to vary from each other. Furthermore, the dispersion value $\lambda_1$ of the central core 11 and the dispersion value $\lambda_2$ of each of the outer cores 12a to 12c tend to vary in the longitudinal direction. Therefore, the present step intends to obtain the difference $\Delta\lambda_{ave}$ between the dispersion value $\lambda_1$ of the central core 11 and the average value $\lambda_{2ave}$ of the dispersion values $\lambda_2$ of the outer cores 12a to 12c at a same position in the longitudinal direction in a state where the section of the core rod 10R to be formed into the central core 11 and the section of the core rod 10R to be formed into the outer cores 12a to 12c are disposed in their individual holes in the capillary 13R. The difference $\Delta\lambda_{ave}$ between the dispersion value $\lambda_1$ of the central core 11 and the average value $\lambda_{2ave}$ of the dispersion values $\lambda_2$ of the outer cores 12a to 12c is represented by $\lambda_{2ave}-\lambda_1$. This difference $\Delta\lambda_{ave}$ varies depending on how to select the section of the core rod 10R to be formed into the central core 11 and the section of the core rod 10R to be formed into the outer cores 12a to 12c.

Furthermore, as described above, since the refractive index of the core rod 10R tends to vary in the longitudinal direction, the reflection wavelengths $\lambda_{B2}$ of the outer cores 12a to 12c due to the FBG in a case where a partial section of the core rod 10R is formed into the central core 11 and another partial section of the core rod 10R is formed into the outer cores 12a to 12c so as to be the multi-core optical fiber 1 tend to vary from each other in the individual outer cores 12, and the reflection wavelengths $\lambda_{B1}$ of the central core 11 due to the FBG and the reflection wavelengths $\lambda_{B2}$ of the outer cores 12a to 12c due to the FBG tend to vary from each other. Furthermore, the reflection wavelength $\lambda_{B1}$ of the central core 11 and the reflection wavelengths $\lambda_{B2}$ of the individual outer cores 12a to 12c tend to vary in the longitudinal direction. Therefore, the present step obtains a difference $\Delta\lambda_{Bave}$ between the reflection wavelength $\lambda_{B1}$ of the central core 11 and the average value $\lambda_{B2ave}$ of the reflection wavelengths $\lambda_{B2}$ of the outer cores 12a to 12c at the same position in the longitudinal direction in a state where the section of the core rod 10R to be formed into the central core 11 and the section of the core rod 10R to be formed into the outer cores 12a to 12c are disposed in the individual holes on the capillary 13R. A difference $\Delta\lambda_{Bave}$ between the reflection wavelength $\lambda_{B1}$ of the central core 11 and the average value $\lambda_{B2ave}$ of the reflection wavelengths $\lambda_{B2}$ of the outer cores 12a to 12c is represented by $\lambda_{B2ave} - \lambda_{B1}$. This difference $\Delta\lambda_{Bave}$ varies depending on the way of selecting the core rod 10R to be formed into the central core 11 and the section of the core rod 10R to be formed into the outer cores 12a to 12c.

In this manner, the difference $\Delta\lambda_{ave}$ between the dispersion value $\lambda_1$ of the central core 11 and the average value $\lambda_{2ave}$ of the dispersion values $\lambda_2$ of the outer cores 12a to 12c is obtained, and the difference $\Delta\lambda_{Bave}$ of the reflection wavelength $\lambda_{B1}$ of the central core 11 and the average value $\lambda_{B2ave}$ of the reflection wavelength $\lambda_{B2}$ of the outer cores 12a to 12c is obtained.

(Selection Step PS5)

The present step is a step that uses the difference $\Delta\lambda_{ave}$ and the difference $\Delta\lambda_{Bave}$ and selects the section of the core rod 10R to be formed into the central core 11 and the section of the core rod 10R to be the outer cores 12a to 12c so that the relative refractive index difference $\Delta_1$ of the section of the core rod 10R to be the central core 11 with respect to the capillary 13R is substantially the same as the average $\Delta_{2ave}$ of the relative refractive index differences $\Delta_2$ of the section of the core rod 10R to be formed into the outer cores 12a to 12c with respect to the capillary 13R.

As described above, since the refractive index of the core rod 10R tends to vary in the longitudinal direction, a section in which the relative refractive index difference $\Delta_1$ and the average $\Delta_{2ave}$ of the relative refractive index difference $\Delta_2$ are substantially the same is selected. In the present step, the difference $\Delta\lambda_{ave}$ and the difference $\Delta\lambda_{Bave}$ are used to select a section where the relative refractive index difference $\Delta_1$ and the average $\Delta_{2ave}$ of the relative refractive index difference $\Delta_2$ are substantially the same. The difference $\delta\Delta_{ave}$ between the relative refractive index difference $\Delta_1$ of the central core 11 with respect to the cladding 13 and the average $\Delta_{2ave}$ of the relative refractive index differences $\Delta_2$ of the outer cores 12a to 12c with respect to the cladding 13 is expressed by the Formula (14). Therefore, the section of the core rod 10R to be formed into the central core 11 and the section of the core rod 10R to be formed into the outer cores 12a to 12c are selected such that the difference $\delta\Delta$ ave is −0.005 or more and 0.005 or less. That is, the section of the core rod 10R to be formed into the central core 11 and the section of the core rod 10R to be formed into the outer cores 12a to 12c are selected so as to satisfy the above Formula (15). Note that the section of the core rod 10R to be formed into the central core 11 and the sections of the core rod 10R to be formed into the outer cores 12a to 12c can be selected to satisfy the above Formula (17).

In this manner, the present step selects the section of the core rod 10R to be formed into the central core 11 and the section of the core rod 10R to be formed into the outer cores 12a to 12c such that the relative refractive index difference $\Delta_1$ of the section of the core rod 10R to be formed into the central core 11 with respect to the capillary 13R is substantially the same as the average $\Delta_{2ave}$ of the relative refractive index difference $\Delta_2$ of the section of the core rod 10R to be formed into the outer cores 12a to 12c with respect to the capillary 13R.

(Arrangement Step PS6)

Figure 7:
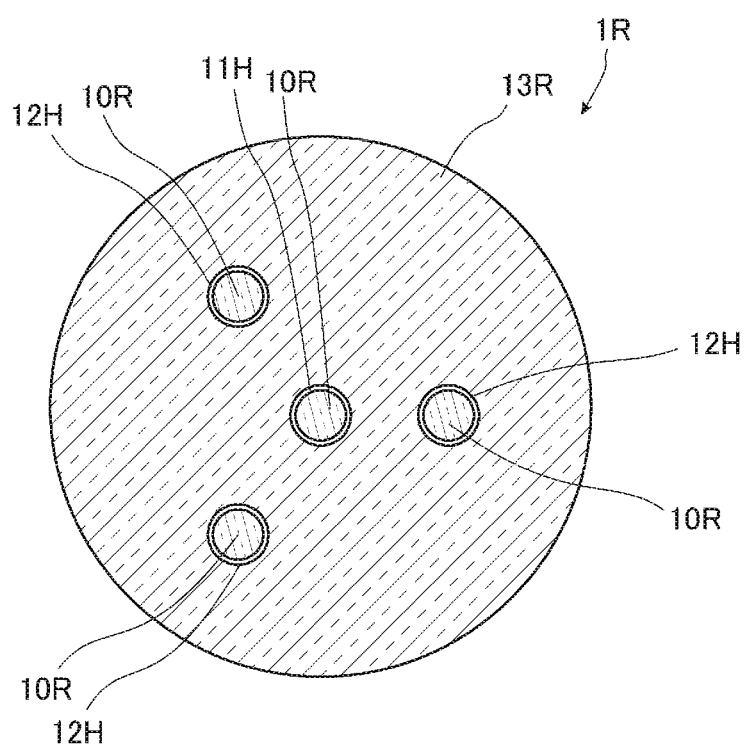
FIG. 7 is a view illustrating a state after an arrangement step.

The present step is a step that arranges the section of the core rod 10R selected as the central core 11 in the central hole 11H of the capillary 13R, and arranges each of sections of the core rod selected as the outer cores 12a to 12c in the outer holes 12H of the capillary 13R. In this manner, as illustrated in FIG. 7, a base material 1R is formed in which the section of the core rod 10R selected as the central core 11 is arranged in the central hole 11H of the capillary 13R and each of sections of the core rod 10R selected as the outer cores 12a to 12c is arranged in each of the outer holes 12H of the capillary 13R. Note that a collapsing step for causing the gaps between the capillary 13R and the each of the core rods 10R to collapse may be performed after the arranging step as needed.

(Drawing Step PS7)

The present step draws the capillary 13R in which each of sections of the core rod 10R has been arranged. FIG. 8 is a view illustrating the state of the present step. First, as a preparatory stage for performing the present step, a base material 1R is installed in a drawing furnace 110. In the base material 1R, the section of the core rod 10R selected as the central core 11 in the arrangement step PS6 has been arranged in the central hole 11H of the capillary 13R and the section of each of the core rods 10R selected as the outer cores 12a to 12c has been arranged in the outer hole 12H of the capillary 13R.

Next, a heating unit 111 of the drawing furnace 110 is heated to heat the base material 1R. At this time, the lower end of the base material 1R is heated to 2000° C., for example, to be in a molten state. Subsequently, glass is melted and drawn from the base material 1R. At this time, the base material 1R is rotated about an axis thereof. As described above, in a case where the number of helical turns of the outer core 12 per unit length is approximately 50 turns/m, for example, the base material 1R is rotated 50 times every time the glass is drawn by 1 m. Furthermore, when the average of the distance d between the central core 11 and the outer cores 12a to 12c is $d_{ave}$ and the number of helical turns of the outer core 12 per unit length is $f_w$, drawing is performed such that the effective refractive index $n_{e1}$ of the central core 11 and the average $n_{e2ave}$ of the effective refractive indices $n_{e2}$ of the outer cores 12a to 12c satisfy the above Formula (9).

The drawn molten glass immediately solidifies after going out from the drawing furnace 110, and the core rod 10R disposed in the central hole 11H is formed into the central core 11, while the core rod 10R disposed in the individual outer holes 12H are formed into the outer cores 12a to 12c, leading to the formation of the multi-core optical fiber illustrated in FIG. 1. Thereafter, the multi-core optical fiber passes through a cooling device 120 to be cooled to an appropriate temperature. The multi-core optical fiber coming from the cooling device 120 passes through a coating device 131 containing an ultraviolet curable resin as a protective layer as needed, so as to be coated with the ultraviolet curable resin. Furthermore, the ultraviolet curable resin passes through an ultraviolet emission device 132 to undergo emission of ultraviolet rays so as to be cured and formed into a protective layer. The direction of the multi-core optical fiber 1 is changed by a turn pulley 141 and is taken up by a reel 142.

Furthermore, in a subsequent step, predetermined light is emitted from the side of the multi-core optical fiber 1 to form FBG in the central core 11 and the outer cores 12a to 12c.

As described above, in order to manufacture the multi-core optical fiber 1 satisfying the condition that the temperature dependence of the refractive index of the central core 11 and the average of the temperature dependence of the refractive indices of the outer cores 12a to 12c are substantially the same and satisfying the above Formula (9), the relative refractive index difference between the core rod to be formed into the central core 11 and the core rod to be formed into the outer cores 12a to 12c are substantially the same. Thus, selecting a section of the core rod 10R to be the central core 11 and the section of the core rod 10R to be the outer cores 12a to 12c from a single core rod 10R would make it possible to achieve the relative refractive index difference substantially the same between the central core 11 and the outer cores 12a to 12c. However, there exists a refractive index profile even in a single core rod, and thus, in the method for manufacturing the multi-core optical fiber according to the present embodiment, the refractive index profile of the core rod 10R is measured, and the above-described difference $\Delta\lambda_{ave}$ and the difference $\Delta_{Bave}$ are obtained from the measured refractive index profile. Thereafter, the section of the core rod 10R to be formed into the central core 11 and the section of the core rod 10R to be formed into the outer cores 12a to 12c are selected so that the relative refractive index difference $\Delta_1$ of the section of the core rod 10R to be the central core 11 and the relative refractive index difference $\Delta_2$ of the section of the core rod 10R to be the outer cores 12a to 12c are substantially the same. In this manner, it is possible to manufacture the multi-core optical fiber 1 in which the relative refractive index difference $\Delta_1$ of the central core 11 and the relative refractive index difference $\Delta_2$ of the outer core 12 are substantially the same.

Although the above is an example of the one or more embodiments of the present invention, the present invention is not limited to the above embodiment, and can be altered freely within the scope of the present invention.

For example, although the above embodiment exemplifies the multi-core optical fiber 1 having the central core 11 and the three outer cores 12a to 12c, it is allowable to have one or more outer cores 12, and the number is not limited to three. For example, using six outer cores 12 would be desirable because this can form a close-packed arrangement in a cross section of a multi-core optical fiber, together with the central core 11.

Furthermore, the diameter of the central core and the diameter of the outer core may be or need not be the same. Furthermore, the relative refractive index difference of the central core with respect to the cladding and the relative refractive index difference of the outer core with respect to the cladding may be or need not be the same. When there is a plurality of outer cores, the diameter of the central core and the average value of the diameters of the plurality of outer cores may or need not be the same. Furthermore, when there is a plurality of outer cores, the relative refractive index difference of the central core with respect to the cladding and the average value of the relative refractive index differences of each of the outer cores with respect to the cladding may be or need not be the same.

Furthermore, for easy understanding, the above embodiment has described an exemplary case where the FBG is formed in the central core 11 and the outer cores 12a to 12c of the multi-core optical fiber 1 over the entire length in the longitudinal direction of the multi-core optical fiber 1. However, the FBG need to be formed over the entire length in the longitudinal direction of the multi-core optical fiber 1, and may be formed in a partial region alone in the longitudinal direction, or it is allowable to omit formation of the FBG.

Furthermore, the FBGs formed on the central core 11 and the outer cores 12a to 12c may be formed in a constant period, or in a continuously alternating period (chirped grating).

The above embodiment has described an example in which the temperature dependence of the refractive index of the central core 11 and the average temperature dependence of the refractive index of the outer core 12 are substantially the same. Incidentally, there might be a case where high measurement accuracy is required even in an environment where the environmental temperature change would cause no big problem. In this case, even a multi-core optical fiber to be described in the following can be a multi-core optical fiber applicable as an optical fiber sensor capable of achieving high measurement accuracy. That is, the multi-core optical fiber includes the central core 11 formed at the center of the cladding 13 and at least one outer core 12 helically wound around the central core 11, and when an average of the distance d between the central core 11 and the outer core 12 is $d_{ave}$ and the number of helical turns of the outer core 12 per unit length is $f_w$, the effective refractive index $n_{e1}$ of the central core 11 and the average $n_{e2ave}$ of the effective refractive indices $n_{e2}$ of the outer cores 12 satisfy the above Formula (9). According to such a multi-core optical fiber, in a case where the effective refractive index $n_{e1}$ of the central core 11 and the average $n_{e2ave}$ of the effective refractive indices $n_{e2}$ of the outer cores 12 satisfy the above Formula (9), it is possible to reduce the average of the difference between the optical path length of the central core 11 and the optical path length of the outer core 12 compared with the case where the effective refractive index $n_{e1}$ of the central core 11 and the average $n_{e2ave}$ of the effective refractive indices $n_{e2}$ of the outer cores 12 is the same even when the temperature dependence of the central core 11 is not substantially the same as the temperature dependence of the outer core 12. Accordingly, using this multi-core optical fiber as an optical fiber sensor makes it possible to achieve high measurement accuracy.

In addition, in the case of a multi-core optical fiber that satisfies the Formula (9) as described above in a case where the environmental temperature change would cause no big problem, the average $n_{e2ave}$ of the effective refractive indices $n_{e2}$ of the outer cores 12 can be set to lower than the effective refractive index $n_{e1}$ of the central core 11 so as to match the ratio between the optical path length of the central core 11 and the average of the optical path lengths of the outer cores 12.

In addition, in the multi-core optical fiber that satisfies the Formula (9) as described above in a case where the environmental temperature change would cause no big problem, the ratio between the effective refractive index $n_{e1}$ of the central core 11 and the average $n_{e2ave}$ of the effective refractive indices $n_{e2}$ of the outer cores satisfies the Formula (13).

Furthermore, in the multi-core optical fiber satisfying the Formula (9) in a case where the environmental temperature change would cause no big problem, the same concentration of germanium may be added to the central core 11 and the outer core 12 as a first additive, and a second additive having a function of reducing the refractive index may be added to the outer core 12. The effective refractive index is affected by the relative refractive index difference of the core with respect to the cladding and the core diameter. Therefore, in a case where the environmental temperature change would cause no big problem, the above Formula (9) may be satisfied by adding an additive different from the central core 11 to the outer core 12 to reduce the refractive index of the outer core 12.

In addition, the FBG can be formed in at least a partial region in the longitudinal direction even in the multi-core optical fiber satisfying the Formula (9) as described above in a case where the environmental temperature change would cause no big problem.

Next, examples and a comparative example will be given to describe the present invention further specifically, although the present invention is not limited to the following examples.

Example 1

A multi-core optical fiber 1 having a length of 5 m illustrated in FIG. 1 was prepared. This multi-core optical fiber 1 has a configuration in which the outer diameter of the cladding 13 is approximately 125 µm, the core diameter is about 5 µm, the core pitch is 35 µm, and the outer cores 12a to 12c are arranged at intervals of 120° from each other with respect to the central core 11. Furthermore, germanium alone was added to the central core 11 and the outer core 12. The difference $\Delta\lambda_{ave}$ between the dispersion value $\lambda_1$ of the central core 11 of the multi-core optical fiber 1 and the average value $\lambda_{2ave}$ of the dispersion values $\lambda_2$ of the outer cores 12 is −0.5 ps/nm/km. The difference $\Delta\lambda_{Bave}$ between the reflection wavelength $\lambda_{B1}$ due to the FBG formed in the central core 11 and the average value $\lambda_{B2ave}$ of the reflection wavelengths $\lambda_{B2}$ due to the FBG formed in the outer core 12 was 0 µm. From the above Formula (14), the difference $\delta\Delta_{ave}$ between the relative refractive index difference $\Delta_1$ of the central core 11 with respect to the cladding 13 and the average $\Delta_{2ave}$ of the relative refractive index differences $\Delta_2$ of the outer cores 12 with respect to the cladding 13 was obtained as −0.002%. FIG. 4 plots this multi-core optical fiber. Next, this multi-core optical fiber was spirally arranged on a plane as an optical fiber sensor for performing shape measurement. Next, calibration was performed in an environment at room temperature of 23 degrees, and then shape sensing was performed in an environment at room temperature of 35 degrees. As a result, a measurement error of 0.1 mm was observed in the direction perpendicular to the plane on which the multi-core optical fiber was arranged. This multi-core optical fiber with such a small error can be determined to have sufficiently high accuracy as an optical fiber sensor.

Example 2

A multi-core optical fiber prepared in Example 2 was similar to the one used in Example 1 except that the difference DA was −0.1 ps/nm/km and the difference $\Delta\lambda_{Bave}$ was 70 µm. The difference $\delta\Delta_{ave}$ of this multi-core optical fiber was determined as 0.000%. FIG. 4 plots this multi-core optical fiber. Next, similarly to Example 1, this multi-core optical fiber was arranged as a multi-core optical fiber sensor, calibrated, and then, sensing was performed. As a result, a measurement error of 0.3 mm was observed in the direction perpendicular to the plane on which the multi-core optical fiber was arranged. This multi-core optical fiber with such a small error can be determined to have sufficiently high accuracy as an optical fiber sensor.

COMPARATIVE EXAMPLE

A multi-core optical fiber prepared in Comparative Example was similar to the one used in Example 1 except that the difference DA was −0.2 ps/nm/km and the difference $\Delta\lambda_{Bave}$ was 70 µm. The difference $\delta\Delta_{ave}$ of this multi-core optical fiber was determined as 0.006%. FIG. 4 plots this multi-core optical fiber. Next, similarly to Example 1, this multi-core optical fiber was arranged as a multi-core optical fiber sensor, calibrated, and then sensing was performed. As a result, a large measurement error of 5 mm was observed in the direction perpendicular to the plane on which the multi-core optical fiber was placed. Although this multi-core optical fiber satisfies the above Formula (9) under an environment of room temperature of 23 degrees in which the calibration was performed, it is considered that the same multi-core optical fiber does not to satisfy the above Formula (9) under the environment of room temperature of 35 degrees in which the measurement was performed.

As described in Example 1, the difference $\delta\Delta_{ave}$ is −0.002% and the measurement error is as small as 0.1 mm. As described in Example 2, the difference $\delta\Delta_{ave}$ is 0.000% and the measurement error is as small as 0.3 mm. Considering the symmetry of the multi-core optical fiber 1, the measurement error can be determined as small even when the difference $\delta\Delta$ ave is 0.002% or 0.000%. In contrast to this result, the comparative example has demonstrated that the difference $\delta\Delta_{ave}$ is 0.006% and the measurement error is as large as 5 mm. From this result, when the difference $\delta\Delta_{ave}$ is −0.005% or more and 0.005% or less, it can be determined that the Formula (9) is satisfied and the measurement error is reduced in the use of the multi-core optical fiber as an optical fiber sensor even when the environmental temperature changes.

Example 3

A multi-core optical fiber prepared in Example 3 was similar to the one used in Example 1 except that the diameter of the central core 11 and the average $D_{2ave}$ of the diameters of the outer cores 12 were made different from each other. Furthermore, the number of helical turns $f_w$ of the outer core 12 is 50 times/m. Specifically, the diameter $D_1$ of the central core 11 was 4.80 µm, and the average $D_{2ave}$ of the diameter $D_2$ of the outer core 12 was 4.77 µm. The difference $\delta D_{ave}$ of this multi-core optical fiber was determined as −0.002%. FIG. 4 plots this multi-core optical fiber. Next, similarly to Example 1, this multi-core optical fiber was arranged as a multi-core optical fiber sensor, calibrated, and then, sensing was performed. As a result, a measurement error of 0.1 mm was observed in the direction perpendicular to the plane on which the multi-core optical fiber was arranged. This multi-core optical fiber with such a small error can be determined to have sufficiently high accuracy as an optical fiber sensor. That is, it has been found that high measurement accuracy can be achieved even when the diameter of the central core and the diameter of the outer core are different and even when the environmental temperature changes.

Example 4

Further study was performed regarding the case where the diameter of the central core is different from the diameter of the outer core. Tables 1 to 8 below illustrate effective refractive indices obtained from the relative refractive index difference $\Delta$ of the core with respect to the cladding and from the diameter D of the core. Specifically, Tables 1 to 8 below demonstrate data representing the possible core diameter and the range of relative refractive index difference $\Delta$ of the outer core and the possible value of the effective refractive index in the outer core within the above range when the diameter of the central core is 4.80 µm. For example, in a case where a plurality of outer cores is arranged as described in the above embodiment, the effective refractive index values in Tables 1 to 8 can be regarded as an average value of the effective refractive indices of the plurality of outer cores. For example, in a case where three outer cores 12 are arranged around the central core 11 as described in the above embodiment, the effective refractive index value in each of Tables 1 to 8 can be regarded as the average value of the effective refractive indices of the three outer cores 12. Note that Tables 1 to 8 is originally one table and has been divided into eight parts so as to fit on the page.

In this example, the relative refractive index difference $\Delta_1$ of the central core 11 was set to 1.100% indicated by underlined bold type in Table 6, and the diameter $D_1$ of the central core 11 was set to 4.8000 μm indicated by underlined bold type in Table 6. Accordingly, the effective refractive index $n_{e1}$ of the central core 11 is 1.4515433. Moreover, the core pitch was set to 35 μm similarly to Example 1, and the number of helical turns $f_w$ of the outer core 12 was set to 50 times/m similarly to Example 3, and the average $n_{e2ave}$ of the effective refractive indices $n_{e2}$ of the outer cores 12 that satisfies the above Formula (8) was obtained. In a case where the effective refractive index $n_{e2}$ satisfies the above Formula (8), the tensile characteristics can be improved. That is, even when the multi-core optical fiber is stretched, it can exhibit good characteristics as an optical fiber sensor. The average $n_{e2ave}$ obtained in this manner was found to be the value indicated in underlined bold type in Tables 1 to 8. That is, the average $D_{2ave}$ of the diameters $D_2$ of the outer cores corresponding to the average $n_{e2ave}$ satisfying the Formula (8) was found to be 4.6700 μm (refer to Table 2) or more and 4.8525 μm (refer to Table 7) or less in the relative refractive index difference $\Delta$ range of 1.090% or more and 1.110% or less.

Next, a difference $\delta\Delta_{ave}$ between the relative refractive index difference $\Delta_1$ of the central core 11 with respect to the cladding 13 and the average $\Delta_{2ave}$ of the relative refractive index differences $\Delta_2$ of the outer cores 12 with respect to the cladding 13 was obtained from the above Formula (14). Among these, the average $n_{e2ave}$ of the effective refractive indices $n_{e2}$ of the outer cores 12 having the difference $\delta\Delta_{ave}$ of −0.005% or more and 0.005% or less was found to be values, in Table 1 to Table 8 connected with each other, within a range enclosed by thick lines including: a thick line indicating a value of core diameter larger than 4.6925 μm and 4.6950 μm or less; a thick line indicating a value of core diameter being 4.8250 μm or more and smaller than 4.8275 μm; a thick line indicating a value of the relative refractive index difference larger than 1.094% and smaller than 1.095%; and a thick line indicating a value of the relative refractive index difference larger than 1.105% and smaller than 1.106%. That is, it has been found that the average $D_{2ave}$ of the diameters $D_2$ of the outer cores 12 corresponding to the value of the average $n_{e2ave}$ having the difference $\delta\Delta_{ave}$ of −0.005% or more and 0.005% or less is 4.6950 μm (refer to Tables 1 and 2) or more and 4.8250 μm (refer to Tables 5 and 6) or less, and the average $\Delta_{2ave}$ of the relative refractive index differences $\Delta_2$ of the outer cores 12 corresponding to the above-described value of the average $n_{e2ave}$ is 1.095% (refer to Tables 1, 3, 5, and 7) or more and 1.105% (refer to Tables 2, 4, 6, and 8) or less. When the average $D_{2ave}$ is 4.6950 μm or more and 4.8250 μm or less, and the average $\Delta_{2ave}$ is 1.095% or more and 1.105% or less, the tensile characteristics can be further improved. That is, even after the multi-core optical fiber is stretched, good characteristics as an optical fiber sensor can be exhibited. In other words, even when the diameter of the central core and the diameter of the outer core are different from each other, the temperature dependence is substantially the same in each of the central core and the outer core, and the tensile characteristics of the multi-core optical fiber can be improved.

Accordingly, when the relative refractive index difference $\Delta_1$ of the central core 11 is 1.100% and the diameter $D_1$ of the central core 11 is 4.8000 μm, that is, when the effective refractive index $n_{e1}$ of the central core 11 is 1.4515433, and the core pitch is 35 μm and the number of helical turns $f_w$ of the outer core 12 is 50 times/m, the average $D_{2ave}$ of the diameters $D_2$ of the outer cores 12 that satisfies the Formula (8) and having the difference $\delta\Delta_{ave}$ being −0.005% or more and 0.005% or less was found to be 4.6950 μm or more and 4.8250 μm or less in a numerical group represented by the underlined bold type in the region surrounded by the four thick lines.

Here, a ratio $\delta\Delta_2$ of the difference between the average $D_{2ave}$ of the diameters $D_2$ of the outer cores 12 and the diameter $D_1$ of the central core 11 to the diameter $D_1$ of the central core 11, that is, the following is defined.

$$\delta D_2 = \{(D_{2ave} - D_1)/D_1\} \times 100$$

Then, when the relative refractive index difference $\Delta_1$ of the central core 11 is 1.100% and the diameter $D_1$ of the central core 11 is 4.8000 μm, that is, when the effective refractive index $n_{e1}$ of the central core 11 is 1.4515433, and the core pitch is 35 μm and the number of helical turns $f_w$ of the outer core 12 is 50 times/m, $\delta\Delta_2$ that satisfies the Formula (8) and having the difference $\delta\Delta_{ave}$ being −0.005% or more and 0.005% or less was found to be −2.19% or more and 0.52% or less because the average $D_{2ave}$ of the core diameters $D_2$ was 4.6950 μm or more and 4.8250 μm or less.

Note that the results of Example 4 above indicate that $\delta D_2$ satisfying (8) and having $\delta D_{ave}$ being −0.005% or more and 0.005% or less under the conditions that the diameter $D_1$ of the central core 11 is 4.8000 μm, the core pitch is 35 μm, and the number of helical turns $f_w$ of the outer core 12 is 50 times/m is in a range of −2.19% or more and 0.52% or less. Note that even when the diameter $D_1$ of the central core 11 is 4.6600 μm or more and 4.890 μm or less, when the core pitch is 33 μm or more and 37 μm or less, and when the number of helical turns $f_w$ of the outer core 12 is 45 times/m or more and 55 times/m or less, $\delta\Delta_2$ satisfying the Formula (8) and having the difference $\delta\Delta_{ave}$ being −0.005% or more and 0.005% or less is approximately −2.19% or more and 0.52% or less.

Still, the diameter $D_1$ of the central core can be 4.695 μm or more and 4.825 μm or less. In a case where the diameter $D_1$ of the central core being 4.695 μm or more and 4.825 μm or less, it is possible to more easily achieve high measurement accuracy regardless of the change in environmental temperature even when the diameter $D_1$ of the central core differs from the average $D_{2ave}$ of the diameters $D_2$ of the outer cores.

TABLE 1

| CORE DIAMETER(μm) | $\Delta$(%) | | | | | | | | | |
|---|---|---|---|---|---|---|---|---|---|---|
| | 1.090 | 1.091 | 1.092 | 1.093 | 1.094 | 1.095 | 1.096 | 1.097 | 1.098 | 1.099 |
| 4.6600 | 1.4511256 | 1.4511367 | 1.4511479 | 1.4511590 | 1.4511701 | 1.4511812 | 1.4511923 | 1.4512035 | 1.4512146 | 1.4512257 |
| 4.6625 | 1.4511312 | 1.4511423 | 1.4511534 | 1.4511645 | 1.4511756 | 1.4511868 | 1.4511979 | 1.4512090 | 1.4512202 | 1.4512313 |
| 4.6650 | 1.4511367 | 1.4511478 | 1.4511589 | 1.4511701 | 1.4511812 | 1.4511923 | 1.4512034 | 1.4512146 | 1.4512257 | 1.4512369 |

TABLE 1-continued

| CORE DIAMETER(μm) | Δ(%) | | | | | | | | | |
|---|---|---|---|---|---|---|---|---|---|---|
| | 1.090 | 1.091 | 1.092 | 1.093 | 1.094 | 1.095 | 1.096 | 1.097 | 1.098 | 1.099 |
| 4.6675 | 1.4511422 | 1.4511534 | 1.4511645 | 1.4511756 | 1.4511867 | 1.4511979 | 1.4512090 | 1.4512201 | 1.4512313 | 1.4512424 |
| 4.6700 | 1.4511478 | 1.4511589 | 1.4511700 | 1.4511811 | 1.4511923 | 1.4512034 | 1.4512146 | 1.4512257 | 1.4512369 | 1.4512480 |
| 4.6725 | 1.4511533 | 1.4511644 | 1.4511755 | 1.4511867 | 1.4511978 | 1.4512090 | 1.4512201 | 1.4512313 | 1.4512424 | 1.4512536 |
| 4.6750 | 1.4511588 | 1.4511699 | 1.4511811 | 1.4511922 | 1.4512034 | 1.4512145 | 1.4512257 | 1.4512368 | 1.4512480 | 1.4512591 |
| 4.6775 | 1.4511643 | 1.4511755 | 1.4511866 | 1.4511977 | 1.4512089 | 1.4512200 | 1.4512312 | 1.4512423 | 1.4512535 | 1.4512647 |
| 4.6800 | 1.4511698 | 1.4511810 | 1.4511921 | 1.4512033 | 1.4512144 | 1.4512256 | 1.4512367 | 1.4512479 | 1.4512591 | 1.4512702 |
| 4.6825 | 1.4511753 | 1.4511865 | 1.4511976 | 1.4512088 | 1.4512199 | 1.4512311 | 1.4512423 | 1.4512534 | 1.4512646 | 1.4512758 |
| 4.6850 | 1.4511808 | 1.4511920 | 1.4512031 | 1.4512143 | 1.4512255 | 1.4512366 | 1.4512478 | 1.4512590 | 1.4512701 | 1.4512813 |
| 4.6875 | 1.4511863 | 1.4511975 | 1.4512087 | 1.4512198 | 1.4512310 | 1.4512421 | 1.4512533 | 1.4512645 | 1.4512757 | 1.4512868 |
| 4.6900 | 1.4511918 | 1.4512030 | 1.4512142 | 1.4512253 | 1.4512365 | 1.4512477 | 1.4512588 | 1.4512700 | 1.4512812 | 1.4512924 |
| 4.6925 | 1.4511973 | 1.4512085 | 1.4512197 | 1.4512308 | 1.4512420 | 1.4512532 | 1.4512643 | 1.4512755 | 1.4512867 | 1.4512979 |
| 4.6950 | 1.4512028 | 1.4512140 | 1.4512251 | 1.4512363 | 1.4512475 | 1.4512587 | 1.4512699 | 1.4512810 | 1.4512922 | 1.4513034 |
| 4.6975 | 1.4512083 | 1.4512195 | 1.4512306 | 1.4512418 | 1.4512530 | 1.4512642 | 1.4512754 | 1.4512866 | 1.4512978 | 1.4513090 |
| 4.7000 | 1.4512138 | 1.4512250 | 1.4512361 | 1.4512473 | 1.4512585 | 1.4512697 | 1.4512809 | 1.4512921 | 1.4513033 | 1.4513145 |
| 4.7025 | 1.4512193 | 1.4512304 | 1.4512416 | 1.4512528 | 1.4512640 | 1.4512752 | 1.4512864 | 1.4512976 | 1.4513088 | 1.4513200 |
| 4.7050 | 1.4512247 | 1.4512359 | 1.4512471 | 1.4512583 | 1.4512695 | 1.4512807 | 1.4512919 | 1.4513031 | 1.4513143 | 1.4513255 |
| 4.7075 | 1.4512302 | 1.4512414 | 1.4512526 | 1.4512638 | 1.4512750 | 1.4512862 | 1.4512974 | 1.4513086 | 1.4513198 | 1.4513310 |
| 4.7100 | 1.4512357 | 1.4512468 | 1.4512580 | 1.4512692 | 1.4512804 | 1.4512916 | 1.4513029 | 1.4513141 | 1.4513253 | 1.4513365 |
| 4.7125 | 1.4512411 | 1.4512523 | 1.4512635 | 1.4512747 | 1.4512859 | 1.4512971 | 1.4513083 | 1.4513196 | 1.4513308 | 1.4513420 |

TABLE 2

| CORE DIAMETER(μm) | Δ(%) | | | | | | | | | | |
|---|---|---|---|---|---|---|---|---|---|---|---|
| | 1.100 | 1.101 | 1.102 | 1.103 | 1.104 | 1.105 | 1.106 | 1.107 | 1.108 | 1.109 | 1.110 |
| 4.6600 | 1.4512369 | 1.4512480 | 1.4512592 | 1.4512703 | 1.4512815 | 1.4512926 | 1.4513038 | 1.4513150 | 1.4513261 | 1.4513373 | 1.4513485 |
| 4.6625 | 1.4512424 | 1.4512536 | 1.4512647 | 1.4512759 | 1.4512871 | 1.4512982 | 1.4513094 | 1.4513206 | 1.4513317 | 1.4513429 | 1.4513541 |
| 4.6650 | 1.4512480 | 1.4512592 | 1.4512703 | 1.4512815 | 1.4512927 | 1.4513038 | 1.4513150 | 1.4513262 | 1.4513374 | 1.4513485 | 1.4513597 |
| 4.6675 | 1.4512536 | 1.4512648 | 1.4512759 | 1.4512871 | 1.4512982 | 1.4513094 | 1.4513206 | 1.4513318 | 1.4513430 | 1.4513542 | 1.4513653 |
| 4.6700 | 1.4512592 | 1.4512703 | 1.4512815 | 1.4512927 | 1.4513038 | 1.4513150 | 1.4513262 | 1.4513374 | 1.4513486 | 1.4513598 | 1.4513710 |
| 4.6725 | 1.4512647 | 1.4512759 | 1.4512871 | 1.4512982 | 1.4513094 | 1.4513206 | 1.4513318 | 1.4513430 | 1.4513542 | 1.4513654 | 1.4513766 |
| 4.6750 | 1.4512703 | 1.4512815 | 1.4512926 | 1.4513038 | 1.4513150 | 1.4513262 | 1.4513374 | 1.4513486 | 1.4513598 | 1.4513710 | 1.4513822 |
| 4.6775 | 1.4512758 | 1.4512870 | 1.4512982 | 1.4513094 | 1.4513206 | 1.4513318 | 1.4513430 | 1.4513542 | 1.4513654 | 1.4513766 | 1.4513878 |
| 4.6800 | 1.4512814 | 1.4512926 | 1.4513038 | 1.4513149 | 1.4513261 | 1.4513373 | 1.4513485 | 1.4513597 | 1.4513709 | 1.4513822 | 1.4513934 |
| 4.6825 | 1.4512869 | 1.4512981 | 1.4513093 | 1.4513205 | 1.4513317 | 1.4513429 | 1.4513541 | 1.4513653 | 1.4513765 | 1.4513877 | 1.4513990 |
| 4.6850 | 1.4512925 | 1.4513037 | 1.4513149 | 1.4513261 | 1.4513373 | 1.4513485 | 1.4513597 | 1.4513709 | 1.4513821 | 1.4513933 | 1.4514045 |
| 4.6875 | 1.4512980 | 1.4513092 | 1.4513204 | 1.4513316 | 1.4513428 | 1.4513540 | 1.4513652 | 1.4513765 | 1.4513877 | 1.4513989 | 1.4514101 |
| 4.6900 | 1.4513036 | 1.4513148 | 1.4513260 | 1.4513372 | 1.4513484 | 1.4513596 | 1.4513708 | 1.4513820 | 1.4513933 | 1.4514045 | 1.4514157 |
| 4.6925 | 1.4513091 | 1.4513203 | 1.4513315 | 1.4513427 | 1.4513539 | 1.4513651 | 1.4513764 | 1.4513876 | 1.4513988 | 1.4514101 | 1.4514213 |
| 4.6950 | 1.4513146 | 1.4513258 | 1.4513370 | 1.4513483 | 1.4513595 | 1.4513707 | 1.4513819 | 1.4513931 | 1.4514044 | 1.4514156 | 1.4514269 |
| 4.6975 | 1.4513202 | 1.4513314 | 1.4513426 | 1.4513538 | 1.4513650 | 1.4513762 | 1.4513875 | 1.4513987 | 1.4514099 | 1.4514212 | 1.4514324 |
| 4.7000 | 1.4513257 | 1.4513369 | 1.4513481 | 1.4513593 | 1.4513706 | 1.4513818 | 1.4513930 | 1.4514043 | 1.4514155 | 1.4514267 | 1.4514380 |
| 4.7025 | 1.4513312 | 1.4513424 | 1.4513536 | 1.4513649 | 1.4513761 | 1.4513873 | 1.4513986 | 1.4514098 | 1.4514210 | 1.4514323 | 1.4514436 |
| 4.7050 | 1.4513367 | 1.4513479 | 1.4513592 | 1.4513704 | 1.4513816 | 1.4513929 | 1.4514041 | 1.4514153 | 1.4514266 | 1.4514378 | 1.4514491 |
| 4.7075 | 1.4513422 | 1.4513534 | 1.4513647 | 1.4513759 | 1.4513871 | 1.4513984 | 1.4514096 | 1.4514209 | 1.4514321 | 1.4514434 | 1.4514547 |
| 4.7100 | 1.4513477 | 1.4513590 | 1.4513702 | 1.4513814 | 1.4513927 | 1.4514039 | 1.4514152 | 1.4514264 | 1.4514377 | 1.4514489 | 1.4514602 |
| 4.7125 | 1.4513532 | 1.4513645 | 1.4513757 | 1.4513869 | 1.4513982 | 1.4514094 | 1.4514207 | 1.4514320 | 1.4514432 | 1.4514545 | 1.4514657 |

TABLE 3

| CORE DIAMETER(μm) | Δ(%) | | | | | | | | | |
|---|---|---|---|---|---|---|---|---|---|---|
| | 1.090 | 1.091 | 1.092 | 1.093 | 1.094 | 1.095 | 1.096 | 1.097 | 1.098 | 1.099 |
| 4.7150 | 1.4512466 | 1.4512578 | 1.4512690 | 1.4512802 | 1.4512914 | 1.4513026 | 1.4513138 | 1.4513250 | 1.4513363 | 1.4513475 |
| 4.7175 | 1.4512520 | 1.4512632 | 1.4512744 | 1.4512856 | 1.4512969 | 1.4513081 | 1.4513193 | 1.4513305 | 1.4513418 | 1.4513530 |
| 4.7200 | 1.4512575 | 1.4512687 | 1.4512799 | 1.4512911 | 1.4513023 | 1.4513135 | 1.4513248 | 1.4513360 | 1.4513472 | 1.4513585 |
| 4.7225 | 1.4512629 | 1.4512741 | 1.4512853 | 1.4512966 | 1.4513078 | 1.4513190 | 1.4513302 | 1.4513415 | 1.4513527 | 1.4513640 |
| 4.7250 | 1.4512684 | 1.4512796 | 1.4512908 | 1.4513020 | 1.4513132 | 1.4513245 | 1.4513357 | 1.4513469 | 1.4513582 | 1.4513694 |
| 4.7275 | 1.4512738 | 1.4512850 | 1.4512962 | 1.4513075 | 1.4513187 | 1.4513299 | 1.4513412 | 1.4513524 | 1.4513637 | 1.4513749 |
| 4.7300 | 1.4512792 | 1.4512904 | 1.4513017 | 1.4513129 | 1.4513241 | 1.4513354 | 1.4513466 | 1.4513579 | 1.4513691 | 1.4513804 |
| 4.7325 | 1.4512847 | 1.4512959 | 1.4513071 | 1.4513183 | 1.4513296 | 1.4513408 | 1.4513521 | 1.4513633 | 1.4513746 | 1.4513858 |
| 4.7350 | 1.4512901 | 1.4513013 | 1.4513125 | 1.4513238 | 1.4513350 | 1.4513463 | 1.4513575 | 1.4513688 | 1.4513800 | 1.4513913 |
| 4.7375 | 1.4512955 | 1.4513067 | 1.4513180 | 1.4513292 | 1.4513405 | 1.4513517 | 1.4513630 | 1.4513742 | 1.4513855 | 1.4513968 |
| 4.7400 | 1.4513009 | 1.4513122 | 1.4513234 | 1.4513346 | 1.4513459 | 1.4513571 | 1.4513684 | 1.4513797 | 1.4513909 | 1.4514022 |
| 4.7425 | 1.4513063 | 1.4513176 | 1.4513288 | 1.4513401 | 1.4513513 | 1.4513626 | 1.4513738 | 1.4513851 | 1.4513964 | 1.4514077 |

TABLE 3-continued

| CORE | Δ(%) | | | | | | | | | |
|---|---|---|---|---|---|---|---|---|---|---|
| DIAMETER(μm) | 1.090 | 1.091 | 1.092 | 1.093 | 1.094 | 1.095 | 1.096 | 1.097 | 1.098 | 1.099 |
| 4.7450 | 1.4513117 | 1.4513230 | 1.4513342 | 1.4513455 | 1.4513568 | 1.4513680 | 1.4513793 | 1.4513906 | 1.4514018 | 1.4514131 |
| 4.7475 | 1.4513171 | 1.4513284 | 1.4513396 | 1.4513509 | 1.4513622 | 1.4513734 | 1.4513847 | 1.4513960 | 1.4514073 | 1.4514186 |
| 4.7500 | 1.4513225 | 1.4513338 | 1.4513451 | 1.4513563 | 1.4513676 | 1.4513789 | 1.4513901 | 1.4514014 | 1.4514127 | 1.4514240 |
| 4.7525 | 1.4513279 | 1.4513392 | 1.4513505 | 1.4513617 | 1.4513730 | 1.4513843 | 1.4513956 | 1.4514068 | 1.4514181 | 1.4514294 |
| 4.7550 | 1.4513333 | 1.4513446 | 1.4513559 | 1.4513671 | 1.4513784 | 1.4513897 | 1.4514010 | 1.4514123 | 1.4514236 | 1.4514349 |
| 4.7575 | 1.4513387 | 1.4513500 | 1.4513613 | 1.4513725 | 1.4513838 | 1.4513951 | 1.4514064 | 1.4514177 | 1.4514290 | 1.4514403 |
| 4.7600 | 1.4513441 | 1.4513554 | 1.4513667 | 1.4513779 | 1.4513892 | 1.4514005 | 1.4514118 | 1.4514231 | 1.4514344 | 1.4514457 |
| 4.7625 | 1.4513495 | 1.4513608 | 1.4513720 | 1.4513833 | 1.4513946 | 1.4514059 | 1.4514172 | 1.4514285 | 1.4514398 | 1.4514511 |
| 4.7650 | 1.4513549 | 1.4513661 | 1.4513774 | 1.4513887 | 1.4514000 | 1.4514113 | 1.4514226 | 1.4514339 | 1.4514452 | 1.4514565 |
| 4.7675 | 1.4513602 | 1.4513715 | 1.4513828 | 1.4513941 | 1.4514054 | 1.4514167 | 1.4514280 | 1.4514393 | 1.4514506 | 1.4514619 |
| 4.7700 | 1.4513656 | 1.4513769 | 1.4513882 | 1.4513995 | 1.4514108 | 1.4514221 | 1.4514334 | 1.4514447 | 1.4514560 | 1.4514674 |

TABLE 4

| CORE | Δ(%) | | | | | | | | | | |
|---|---|---|---|---|---|---|---|---|---|---|---|
| DIAMETER(μm) | 1.100 | 1.101 | 1.102 | 1.103 | 1.104 | 1.105 | 1.106 | 1.107 | 1.108 | 1.109 | 1.110 |
| 4.7150 | 1.4513587 | 1.4513700 | 1.4513812 | 1.4513925 | 1.4514037 | 1.4514150 | 1.4514262 | 1.4514375 | 1.4514487 | 1.4514600 | 1.4514713 |
| 4.7175 | 1.4513642 | 1.4513755 | 1.4513867 | 1.4513980 | 1.4514092 | 1.4514205 | 1.4514317 | 1.4514430 | 1.4514543 | 1.4514655 | 1.4514768 |
| 4.7200 | 1.4513697 | 1.4513810 | 1.4513922 | 1.4514035 | 1.4514147 | 1.4514260 | 1.4514373 | 1.4514485 | 1.4514598 | 1.4514711 | 1.4514824 |
| 4.7225 | 1.4513752 | 1.4513864 | 1.4513977 | 1.4514090 | 1.4514202 | 1.4514315 | 1.4514428 | 1.4514540 | 1.4514653 | 1.4514766 | 1.4514879 |
| 4.7250 | 1.4513807 | 1.4513919 | 1.4514032 | 1.4514145 | 1.4514257 | 1.4514370 | 1.4514483 | 1.4514595 | 1.4514708 | 1.4514821 | 1.4514934 |
| 4.7275 | 1.4513862 | 1.4513974 | 1.4514087 | 1.4514199 | 1.4514312 | 1.4514425 | 1.4514538 | 1.4514651 | 1.4514763 | 1.4514876 | 1.4514989 |
| 4.7300 | 1.4513916 | 1.4514029 | 1.4514142 | 1.4514254 | 1.4514367 | 1.4514480 | 1.4514593 | 1.4514706 | 1.4514818 | 1.4514931 | 1.4515044 |
| 4.7325 | 1.4513971 | 1.4514084 | 1.4514196 | 1.4514309 | 1.4514422 | 1.4514535 | 1.4514648 | 1.4514761 | 1.4514874 | 1.4514986 | 1.4515099 |
| 4.7350 | 1.4514026 | 1.4514138 | 1.4514251 | 1.4514364 | 1.4514477 | 1.4514590 | 1.4514703 | 1.4514815 | 1.4514928 | 1.4515042 | 1.4515155 |
| 4.7375 | 1.4514080 | 1.4514193 | 1.4514306 | 1.4514419 | 1.4514532 | 1.4514644 | 1.4514757 | 1.4514870 | 1.4514983 | 1.4515097 | 1.4515210 |
| 4.7400 | 1.4514135 | 1.4514248 | 1.4514361 | 1.4514473 | 1.4514586 | 1.4514699 | 1.4514812 | 1.4514925 | 1.4515038 | 1.4515151 | 1.4515265 |
| 4.7425 | 1.4514189 | 1.4514302 | 1.4514415 | 1.4514528 | 1.4514641 | 1.4514754 | 1.4514867 | 1.4514980 | 1.4515093 | 1.4515206 | 1.4515320 |
| 4.7450 | 1.4514244 | 1.4514357 | 1.4514470 | 1.4514583 | 1.4514696 | 1.4514809 | 1.4514922 | 1.4515035 | 1.4515148 | 1.4515261 | 1.4515374 |
| 4.7475 | 1.4514298 | 1.4514411 | 1.4514524 | 1.4514637 | 1.4514750 | 1.4514863 | 1.4514976 | 1.4515090 | 1.4515203 | 1.4515316 | 1.4515429 |
| 4.7500 | 1.4514353 | 1.4514466 | 1.4514579 | 1.4514692 | 1.4514805 | 1.4514918 | 1.4515031 | 1.4515144 | 1.4515258 | 1.4515371 | 1.4515484 |
| 4.7525 | 1.4514407 | 1.4514520 | 1.4514633 | 1.4514746 | 1.4514859 | 1.4514973 | 1.4515086 | 1.4515199 | 1.4515312 | 1.4515426 | 1.4515539 |
| 4.7550 | 1.4514462 | 1.4514575 | 1.4514688 | 1.4514801 | 1.4514914 | 1.4515027 | 1.4515140 | 1.4515254 | 1.4515367 | 1.4515480 | 1.4515594 |
| 4.7575 | 1.4514516 | 1.4514629 | 1.4514742 | 1.4514855 | 1.4514968 | 1.4515082 | 1.4515195 | 1.4515308 | 1.4515422 | 1.4515535 | 1.4515648 |
| 4.7600 | 1.4514570 | 1.4514683 | 1.4514796 | 1.4514910 | 1.4515023 | 1.4515136 | 1.4515249 | 1.4515363 | 1.4515476 | 1.4515590 | 1.4515703 |
| 4.7625 | 1.4514624 | 1.4514738 | 1.4514851 | 1.4514964 | 1.4515077 | 1.4515191 | 1.4515304 | 1.4515417 | 1.4515531 | 1.4515644 | 1.4515758 |
| 4.7650 | 1.4514679 | 1.4514792 | 1.4514905 | 1.4515018 | 1.4515132 | 1.4515245 | 1.4515358 | 1.4515472 | 1.4515585 | 1.4515699 | 1.4515812 |
| 4.7675 | 1.4514733 | 1.4514846 | 1.4514959 | 1.4515073 | 1.4515186 | 1.4515299 | 1.4515413 | 1.4515526 | 1.4515640 | 1.4515753 | 1.4515867 |
| 4.7700 | 1.4514787 | 1.4514900 | 1.4515013 | 1.4515127 | 1.4515240 | 1.4515354 | 1.4515467 | 1.4515581 | 1.4515694 | 1.4515808 | 1.4515921 |

TABLE 5

| CORE | Δ(%) | | | | | | | | | |
|---|---|---|---|---|---|---|---|---|---|---|
| DIAMETER(μm) | 1.090 | 1.091 | 1.092 | 1.093 | 1.094 | 1.095 | 1.096 | 1.097 | 1.098 | 1.099 |
| 4.7725 | 1.4513710 | 1.4513823 | 1.4513936 | 1.4514049 | 1.4514162 | 1.4514275 | 1.4514388 | 1.4514501 | 1.4514614 | 1.4514728 |
| 4.7750 | 1.4513763 | 1.4513876 | 1.4513989 | 1.4514102 | 1.4514216 | 1.4514329 | 1.4514442 | 1.4514555 | 1.4514668 | 1.4514782 |
| 4.7775 | 1.4513817 | 1.4513930 | 1.4514043 | 1.4514156 | 1.4514269 | 1.4514382 | 1.4514496 | 1.4514609 | 1.4514722 | 1.4514835 |
| 4.7800 | 1.4513871 | 1.4513984 | 1.4514097 | 1.4514210 | 1.4514323 | 1.4514436 | 1.4514549 | 1.4514663 | 1.4514776 | 1.4514889 |
| 4.7825 | 1.4513924 | 1.4514037 | 1.4514150 | 1.4514263 | 1.4514377 | 1.4514490 | 1.4514603 | 1.4514717 | 1.4514830 | 1.4514943 |
| 4.7850 | 1.4513978 | 1.4514091 | 1.4514204 | 1.4514317 | 1.4514430 | 1.4514544 | 1.4514657 | 1.4514770 | 1.4514884 | 1.4514997 |
| 4.7875 | 1.4514031 | 1.4514144 | 1.4514257 | 1.4514371 | 1.4514484 | 1.4514597 | 1.4514711 | 1.4514824 | 1.4514937 | 1.4515051 |
| 4.7900 | 1.4514084 | 1.4514198 | 1.4514311 | 1.4514424 | 1.4514537 | 1.4514651 | 1.4514764 | 1.4514878 | 1.4514991 | 1.4515105 |
| 4.7925 | 1.4514138 | 1.4514251 | 1.4514364 | 1.4514478 | 1.4514591 | 1.4514704 | 1.4514818 | 1.4514931 | 1.4515045 | 1.4515158 |
| 4.7950 | 1.4514191 | 1.4514304 | 1.4514418 | 1.4514531 | 1.4514644 | 1.4514758 | 1.4514871 | 1.4514985 | 1.4515098 | 1.4515212 |
| 4.7975 | 1.4514244 | 1.4514358 | 1.4514471 | 1.4514584 | 1.4514698 | 1.4514811 | 1.4514925 | 1.4515038 | 1.4515152 | 1.4515266 |
| 4.8000 | 1.4514298 | 1.4514411 | 1.4514524 | 1.4514638 | 1.4514751 | 1.4514865 | 1.4514978 | 1.4515092 | 1.4515206 | 1.4515319 |
| 4.8025 | 1.4514351 | 1.4514464 | 1.4514578 | 1.4514691 | 1.4514805 | 1.4514918 | 1.4515032 | 1.4515145 | 1.4515259 | 1.4515373 |
| 4.8050 | 1.4514404 | 1.4514517 | 1.4514631 | 1.4514744 | 1.4514858 | 1.4514972 | 1.4515085 | 1.4515199 | 1.4515313 | 1.4515426 |
| 4.8075 | 1.4514457 | 1.4514570 | 1.4514684 | 1.4514798 | 1.4514911 | 1.4515025 | 1.4515125 | 1.4515252 | 1.4515366 | 1.4515480 |
| 4.8100 | 1.4514510 | 1.4514624 | 1.4514737 | 1.4514851 | 1.4514964 | 1.4515078 | 1.4515192 | 1.4515306 | 1.4515419 | 1.4515533 |
| 4.8125 | 1.4514563 | 1.4514677 | 1.4514790 | 1.4514904 | 1.4515018 | 1.4515131 | 1.4515245 | 1.4515359 | 1.4515473 | 1.4515587 |
| 4.8150 | 1.4514616 | 1.4514730 | 1.4514843 | 1.4514957 | 1.4515071 | 1.4515185 | 1.4515298 | 1.4515412 | 1.4515526 | 1.4515640 |
| 4.8175 | 1.4514669 | 1.4514783 | 1.4514896 | 1.4515010 | 1.4515124 | 1.4515238 | 1.4515352 | 1.4515465 | 1.4515579 | 1.4515693 |

TABLE 5-continued

| CORE | Δ(%) | | | | | | | | | |
|---|---|---|---|---|---|---|---|---|---|---|
| DIAMETER(μm) | 1.090 | 1.091 | 1.092 | 1.093 | 1.094 | 1.095 | 1.096 | 1.097 | 1.098 | 1.099 |
| 4.8200 | 1.4514722 | 1.4514836 | 1.4514949 | 1.4515063 | 1.4515177 | 1.4515291 | 1.4515405 | 1.4515519 | 1.4515633 | 1.4515747 |
| 4.8225 | 1.4514775 | 1.4514889 | 1.4515002 | 1.4515116 | 1.4515230 | 1.4515344 | 1.4515458 | 1.4515572 | 1.4515686 | 1.4515800 |
| 4.8250 | 1.4514828 | 1.4514942 | 1.4515055 | 1.4515169 | 1.4515283 | 1.4515397 | 1.4515511 | 1.4515625 | 1.4515739 | 1.4515853 |
| 4.8275 | 1.4514881 | 1.4514994 | 1.4515155 | 1.4515222 | 1.4515336 | 1.4515450 | 1.4515564 | 1.4515678 | 1.4515792 | 1.4515906 |
| 4.8300 | 1.4514933 | 1.4515047 | 1.4515161 | 1.4515275 | 1.4515389 | 1.4515503 | 1.4515617 | 1.4515731 | 1.4515845 | 1.4515959 |

TABLE 6

| CORE | Δ(%) | | | | | | | | | | |
|---|---|---|---|---|---|---|---|---|---|---|---|
| DIAMETER(μm) | 1.100 | 1.101 | 1.102 | 1.103 | 1.104 | 1.105 | 1.106 | 1.107 | 1.108 | 1.109 | 1.110 |
| 4.7725 | 1.4514841 | 1.4514954 | 1.4515068 | 1.4515181 | 1.4515294 | 1.4515408 | 1.4515521 | 1.4515635 | 1.4515749 | 1.4515862 | 1.4515976 |
| 4.7750 | 1.4514895 | 1.4515008 | 1.4515122 | 1.4515235 | 1.4515349 | 1.4515462 | 1.4515576 | 1.4515689 | 1.4515803 | 1.4515917 | 1.4516030 |
| 4.7775 | 1.4514949 | 1.4515062 | 1.4515176 | 1.4515289 | 1.4515403 | 1.4515516 | 1.4515630 | 1.4515744 | 1.4515857 | 1.4515971 | 1.4516085 |
| 4.7800 | 1.4515003 | 1.4515116 | 1.4515230 | 1.4515343 | 1.4515457 | 1.4515570 | 1.4515684 | 1.4515798 | 1.4515911 | 1.4516025 | 1.4516139 |
| 4.7825 | 1.4515057 | 1.4515170 | 1.4515284 | 1.4515397 | 1.4515511 | 1.4515625 | 1.4515738 | 1.4515852 | 1.4515966 | 1.4516080 | 1.4516193 |
| 4.7850 | 1.4515111 | 1.4515224 | 1.4515338 | 1.4515451 | 1.4515565 | 1.4515679 | 1.4515792 | 1.4515906 | 1.4516020 | 1.4516134 | 1.4516248 |
| 4.7875 | 1.4515164 | 1.4515278 | 1.4515392 | 1.4515505 | 1.4515619 | 1.4515733 | 1.4515846 | 1.4515960 | 1.4516074 | 1.4516188 | 1.4516302 |
| 4.7900 | 1.4515218 | 1.4515332 | 1.4515445 | 1.4515559 | 1.4515673 | 1.4515787 | 1.4515900 | 1.4516014 | 1.4516128 | 1.4516242 | 1.4516356 |
| 4.7925 | 1.4515272 | 1.4515386 | 1.4515499 | 1.4515613 | 1.4515727 | 1.4515841 | 1.4515954 | 1.4516068 | 1.4516182 | 1.4516296 | 1.4516410 |
| 4.7950 | 1.4515326 | 1.4515439 | 1.4515553 | 1.4515667 | 1.4515781 | 1.4515895 | 1.4516008 | 1.4516122 | 1.4516236 | 1.4516350 | 1.4516464 |
| 4.7975 | 1.4515379 | 1.4515493 | 1.4515607 | 1.4515721 | 1.4515835 | 1.4515948 | 1.4516062 | 1.4516176 | 1.4516290 | 1.4516404 | 1.4516518 |
| 4.8000 | 1.4515433 | 1.4515547 | 1.4515661 | 1.4515774 | 1.4515888 | 1.4516002 | 1.4516116 | 1.4516230 | 1.4516344 | 1.4516458 | 1.4516572 |
| 4.8025 | 1.4515487 | 1.4515600 | 1.4515714 | 1.4515828 | 1.4515942 | 1.4516056 | 1.4516170 | 1.4516284 | 1.4516398 | 1.4516512 | 1.4516626 |
| 4.8050 | 1.4515540 | 1.4515654 | 1.4515768 | 1.4515882 | 1.4515996 | 1.4516110 | 1.4516224 | 1.4516338 | 1.4516452 | 1.4516566 | 1.4516680 |
| 4.8075 | 1.4515594 | 1.4515708 | 1.4515822 | 1.4515935 | 1.4516049 | 1.4516164 | 1.4516278 | 1.4516392 | 1.4516506 | 1.4516620 | 1.4516734 |
| 4.8100 | 1.4515647 | 1.4515761 | 1.4515875 | 1.4515989 | 1.4516103 | 1.4516217 | 1.4516331 | 1.4516445 | 1.4516560 | 1.4516674 | 1.4516788 |
| 4.8125 | 1.4515701 | 1.4515815 | 1.4515929 | 1.4516043 | 1.4516157 | 1.4516271 | 1.4516385 | 1.4516499 | 1.4516613 | 1.4516728 | 1.4516842 |
| 4.8150 | 1.4515754 | 1.4515868 | 1.4515982 | 1.4516096 | 1.4516210 | 1.4516324 | 1.4516439 | 1.4516553 | 1.4516667 | 1.4516781 | 1.4516896 |
| 4.8175 | 1.4515807 | 1.4515921 | 1.4516036 | 1.4516150 | 1.4516264 | 1.4516378 | 1.4516492 | 1.4516607 | 1.4516721 | 1.4516835 | 1.4516950 |
| 4.8200 | 1.4515861 | 1.4515975 | 1.4516089 | 1.4516203 | 1.4516317 | 1.4516432 | 1.4516546 | 1.4516660 | 1.4516774 | 1.4516889 | 1.4517003 |
| 4.8225 | 1.4515914 | 1.4516028 | 1.4516142 | 1.4516256 | 1.4516371 | 1.4516485 | 1.4516599 | 1.4516714 | 1.4516828 | 1.4516942 | 1.4517057 |
| 4.8250 | 1.4515967 | 1.4516081 | 1.4516196 | 1.4516310 | 1.4516424 | 1.4516538 | 1.4516653 | 1.4516767 | 1.4516882 | 1.4516996 | 1.4517111 |
| 4.8275 | 1.4516020 | 1.4516135 | 1.4516249 | 1.4516363 | 1.4516477 | 1.4516592 | 1.4516706 | 1.4516821 | 1.4516935 | 1.4517050 | 1.4517164 |
| 4.8300 | 1.4516074 | 1.4516188 | 1.4516302 | 1.4516416 | 1.4516531 | 1.4516645 | 1.4516760 | 1.4516874 | 1.4516989 | 1.4517103 | 1.4517218 |

TABLE 7

| CORE | Δ(%) | | | | | | | | | |
|---|---|---|---|---|---|---|---|---|---|---|
| DIAMETER(μm) | 1.090 | 1.091 | 1.092 | 1.093 | 1.094 | 1.095 | 1.096 | 1.097 | 1.098 | 1.099 |
| 4.8325 | 1.4514986 | 1.4515100 | 1.4515214 | 1.4515328 | 1.4515442 | 1.4515556 | 1.4515670 | 1.4515784 | 1.4515898 | 1.4516012 |
| 4.8350 | 1.4515039 | 1.4515153 | 1.4515267 | 1.4515381 | 1.4515495 | 1.4515609 | 1.4515723 | 1.4515837 | 1.4515951 | 1.4516066 |
| 4.8375 | 1.4515091 | 1.4515205 | 1.4515319 | 1.4515433 | 1.4515548 | 1.4515662 | 1.4515776 | 1.4515890 | 1.4516004 | 1.4516119 |
| 4.8400 | 1.4515144 | 1.4515258 | 1.4515372 | 1.4515486 | 1.4515600 | 1.4515714 | 1.4515829 | 1.4515943 | 1.4516057 | 1.4516172 |
| 4.8425 | 1.4515197 | 1.4515311 | 1.4515425 | 1.4515539 | 1.4515653 | 1.4515767 | 1.4515882 | 1.4515996 | 1.4516110 | 1.4516224 |
| 4.8450 | 1.4515249 | 1.4515363 | 1.4515477 | 1.4515592 | 1.4515706 | 1.4515820 | 1.4515934 | 1.4516049 | 1.4516163 | 1.4516277 |
| 4.8475 | 1.4515302 | 1.4515416 | 1.4515530 | 1.4515644 | 1.4515758 | 1.4515873 | 1.4515987 | 1.4516101 | 1.4516216 | 1.4516330 |
| 4.8500 | 1.4515354 | 1.4515468 | 1.4515583 | 1.4515697 | 1.4515811 | 1.4515925 | 1.4516040 | 1.4516154 | 1.4516269 | 1.4516383 |
| 4.8525 | 1.4515407 | 1.4515521 | 1.4515635 | 1.4515749 | 1.4515864 | 1.4515978 | 1.4516092 | 1.4516207 | 1.4516321 | 1.4516436 |
| 4.8550 | 1.4515459 | 1.4515573 | 1.4515688 | 1.4515802 | 1.4515916 | 1.4516031 | 1.4516145 | 1.4516260 | 1.4516374 | 1.4516489 |
| 4.8575 | 1.4515511 | 1.4515626 | 1.4515740 | 1.4515854 | 1.4515969 | 1.4516083 | 1.4516198 | 1.4516312 | 1.4516427 | 1.4516541 |
| 4.8600 | 1.4515564 | 1.4515678 | 1.4515792 | 1.4515907 | 1.4516021 | 1.4516136 | 1.4516250 | 1.4516365 | 1.4516479 | 1.4516594 |
| 4.8625 | 1.4515616 | 1.4515730 | 1.4515845 | 1.4515959 | 1.4516074 | 1.4516188 | 1.4516303 | 1.4516417 | 1.4516532 | 1.4516647 |
| 4.8650 | 1.4515668 | 1.4515783 | 1.4515897 | 1.4516011 | 1.4516126 | 1.4516241 | 1.4516355 | 1.4516470 | 1.4516584 | 1.4516699 |
| 4.8675 | 1.4515720 | 1.4515835 | 1.4515949 | 1.4516064 | 1.4516178 | 1.4516293 | 1.4516408 | 1.4516522 | 1.4516637 | 1.4516752 |
| 4.8700 | 1.4515773 | 1.4515887 | 1.4516002 | 1.4516116 | 1.4516231 | 1.4516345 | 1.4516460 | 1.4516575 | 1.4516689 | 1.4516804 |
| 4.8725 | 1.4515825 | 1.4515939 | 1.4516054 | 1.4516168 | 1.4516283 | 1.4516398 | 1.4516512 | 1.4516627 | 1,4516742 | 1.4516857 |
| 4.8750 | 1.4515877 | 1.4515991 | 1.4516106 | 1.4516221 | 1.4516335 | 1.4516450 | 1.4516565 | 1.4516679 | 1.4516794 | 1.4516909 |
| 4.8775 | 1.4515929 | 1.4516043 | 1.4516158 | 1.4516273 | 1.4516387 | 1.4516502 | 1.4516617 | 1.4516732 | 1.4516847 | 1.4516962 |
| 4.8800 | 1.4515981 | 1.4516095 | 1.4516210 | 1.4516325 | 1.4516440 | 1.4516554 | 1.4516669 | 1.4516784 | 1.4516899 | 1.4517014 |

TABLE 7-continued

| CORE | Δ(%) | | | | | | | | | |
|---|---|---|---|---|---|---|---|---|---|---|
| DIAMETER(μm) | 1.090 | 1.091 | 1.092 | 1.093 | 1.094 | 1.095 | 1.096 | 1.097 | 1.098 | 1.099 |
| 4.8825 | 1.4516033 | 1.4516147 | 1.4516262 | 1.4516377 | 1.4516492 | 1.4516607 | 1.4516721 | 1.4516836 | 1.4516951 | 1.4517066 |
| 4.8850 | 1.4516085 | 1.4516199 | 1.4516314 | 1.4516429 | 1.4516544 | 1.4516659 | 1.4516774 | 1.4516888 | 1.4517003 | 1.4517118 |
| 4.8875 | 1.4516137 | 1.4516251 | 1.4516366 | 1.4516481 | 1.4516596 | 1.4516711 | 1.4516826 | 1.4516941 | 1.4517056 | 1.4517171 |
| 4.8900 | 1.4516188 | 1.4516303 | 1.4516418 | 1.4516533 | 1.4516648 | 1.4516763 | 1.4516878 | 1.4516993 | 1.4517108 | 1.4517223 |

TABLE 8

| CORE | Δ(%) | | | | | | | | | |
|---|---|---|---|---|---|---|---|---|---|---|
| DIAMETER(μm) | 1.100 | 1.101 | 1.102 | 1.103 | 1.104 | 1.105 | 1.106 | 1.107 | 1.108 | 1.109 | 1.110 |
| 4.8325 | 1.4516127 | 1.4516241 | 1.4516355 | 1.4516470 | 1.4516584 | 1.4516699 | 1.4516813 | 1.4516928 | 1.4517042 | 1.4517157 | 1.4517271 |
| 4.8350 | 1.4516180 | 1.4516294 | 1.4516409 | 1.4516523 | 1.4516637 | 1.4516752 | 1.4516866 | 1.4516981 | 1.4517095 | 1.4517210 | 1.4517325 |
| 4.8375 | 1.4516233 | 1.4516347 | 1.4516462 | 1.4516576 | 1.4516691 | 1.4516805 | 1.4516820 | 1.4517034 | 1.4517149 | 1.4517263 | 1.4517378 |
| 4.8400 | 1.4516286 | 1.4516400 | 1.4516515 | 1.4516629 | 1.4516744 | 1.4516858 | 1.4516973 | 1.4517087 | 1.4517202 | 1.4517317 | 1.4517432 |
| 4.8425 | 1.4516339 | 1.4516453 | 1.4516568 | 1.4516682 | 1.4516797 | 1.4516911 | 1.4517026 | 1.4517141 | 1.4517255 | 1.4517370 | 1.4517485 |
| 4.8450 | 1.4516392 | 1.4516506 | 1.4516621 | 1.4516735 | 1.4516850 | 1.4516965 | 1.4517079 | 1.4517194 | 1.4517309 | 1.4517423 | 1.4517538 |
| 4.8475 | 1.4516445 | 1.4516559 | 1.4516674 | 1.4516788 | 1.4516903 | 1.4517018 | 1.4517132 | 1.4517247 | 1.4517362 | 1.4517477 | 1.4517592 |
| 4.8500 | 1.4516498 | 1.4516612 | 1.4516727 | 1.4516841 | 1.4516956 | 1.4517071 | 1.4517185 | 1.4517300 | 1.4517415 | 1.4517530 | 1.4517645 |
| 4.8525 | 1.4516550 | 1.4516665 | 1.4516780 | 1.4516894 | 1.4517009 | 1.4517124 | 1.4517238 | 1.4517353 | 1.4517468 | 1.4517583 | 1.4517698 |
| 4.8550 | 1.4516603 | 1.4516718 | 1.4516832 | 1.4516947 | 1.4517062 | 1.4517177 | 1.4517292 | 1.4517406 | 1.4517521 | 1.4517636 | 1.4517751 |
| 4.8575 | 1.4516656 | 1.4516771 | 1.4516885 | 1.4517000 | 1.4517115 | 1.4517230 | 1.4517345 | 1.4517459 | 1.4517574 | 1.4517689 | 1.4517804 |
| 4.8600 | 1.4516709 | 1.4516823 | 1.4516938 | 1.4517053 | 1.4517168 | 1.4517283 | 1.4517397 | 1.4517512 | 1.4517627 | 1.4517742 | 1.4517857 |
| 4.8625 | 1.4516761 | 1.4516876 | 1.4516991 | 1.4517106 | 1.4517220 | 1.4517335 | 1.4517450 | 1.4517565 | 1.4517680 | 1.4517795 | 1.4517910 |
| 4.8650 | 1.4516814 | 1.4516929 | 1.4517044 | 1.4517158 | 1.4517273 | 1.4517388 | 1.4517503 | 1.4517618 | 1.4517733 | 1.4517848 | 1.4517963 |
| 4.8675 | 1.4516866 | 1.4516981 | 1.4517096 | 1.4517211 | 1.4517326 | 1.4517441 | 1.4517556 | 1.4517671 | 1.4517786 | 1.4517901 | 1.4518016 |
| 4.8700 | 1.4516919 | 1.4517034 | 1.4517149 | 1.4517264 | 1.4517379 | 1.4517494 | 1.4517609 | 1.4517724 | 1.4517839 | 1.4517954 | 1.4518069 |
| 4.8725 | 1.4516972 | 1.4517086 | 1.4517201 | 1.4517316 | 1.4517431 | 1.4517546 | 1.4517661 | 1.4517777 | 1.4517892 | 1.4518007 | 1.4518122 |
| 4.8750 | 1.4517024 | 1.4517139 | 1.4517254 | 1.4517369 | 1.4517484 | 1.4517599 | 1.4517714 | 1.4517829 | 1.4517945 | 1.4518060 | 1.4518175 |
| 4.8775 | 1.4517076 | 1.4517191 | 1.4517306 | 1.4517421 | 1.4517537 | 1.4517652 | 1.4517767 | 1.4517882 | 1.4517997 | 1.4518113 | 1.4518228 |
| 4.8800 | 1.4517129 | 1.4517244 | 1.4517359 | 1.4517474 | 1.4517589 | 1.4517704 | 1.4517819 | 1.4517935 | 1.4518050 | 1.4518165 | 1.4518281 |
| 4.8825 | 1.4517181 | 1.4517296 | 1.4817411 | 1.4517526 | 1.4517642 | 1.4517757 | 1.4517872 | 1.4517987 | 1.4518103 | 1.4518218 | 1.4518333 |
| 4.8850 | 1.4517234 | 1.4517349 | 1.4517464 | 1.4517579 | 1.4517694 | 1.4517809 | 1.4517925 | 1.4516040 | 1.4518155 | 1.4518271 | 1.4518386 |
| 4.8875 | 1.4517286 | 1.4517401 | 1.4517516 | 1.4517631 | 1.4517747 | 1.4517862 | 1.4517977 | 1.4518092 | 1.4518208 | 1.4518323 | 1.4518439 |
| 4.8900 | 1.4517338 | 1.4517453 | 1.4517568 | 1.4517684 | 1.4517799 | 1.4517914 | 1.4518030 | 1.4518145 | 1.4518260 | 1.4518376 | 1.4518491 |

As described above, according to one or more embodiments of the present invention, it is possible to provide a multi-core optical fiber applicable as an optical fiber sensor capable of achieving high measurement accuracy even when the environmental temperature changes, and a method for manufacturing the multi-core optical fiber, making it possible to utilize the multi-core optical fiber in the field of optical fiber sensors.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 multi-core optical fiber
11 central core
12, 12a to 12c outer core
13 cladding
10R core rod
13R capillary

The invention claimed is:
1. A multi-core optical fiber comprising:
a central core disposed at the center of a cladding; and
outer cores helically wound around the central core,
wherein the following Formula (1) is satisfied:

$$n_{e1} \times \left(\frac{1}{fw} - B\right) < n_{e2ave} \times \left(\frac{1}{fw} + A\right) < n_{e1} \times \left(\frac{1}{fw} + B\right) \quad (1)$$

$$A = \sqrt{\left(\frac{1}{fw}\right)^2 + (2nd_{ave})^2} - \frac{1}{fw}$$

$$B = \frac{A}{1 + A \cdot fw}$$

where
$d_{ave}$ is an average of a distance d between the central core and the outer cores,
$f_w$ is the number of helical turns of the outer cores per unit length,
$n_{e1}$ is an effective refractive index of the central core, and
$n_{e2ave}$ is an average of effective refractive indices of the outer cores.
2. A method for manufacturing the multi-core optical fiber according to claim 1, wherein a cylindrical capillary forms at least part of the cladding, the capillary having a uniform refractive index and having a central hole in the center in a radial direction and at least one outer hole formed around the central hole, the method comprising:
forming a core rod into the central core and the outer cores, wherein a first section of the core rod is formed into the central core and second sections of the core rod are respectively formed into the outer cores;

measuring a refractive index profile in a longitudinal direction of the core rod;

calculating a profile of a dispersion value of an optical fiber manufactured from a base material in which the core rod is surrounded by a glass body having the same refractive index as the capillary;

calculating a profile of a reflection wavelength, wherein fiber Bragg gratings (FBG) are formed at predetermined intervals on the core of the optical fiber;

calculating a difference $\Delta\lambda_{ave}$ between a dispersion value $\lambda_1$ of the central core and an average value $\lambda_{2ave}$ of dispersion values $\lambda_2$ of the outer cores using the calculated profile of the dispersion values;

calculating a difference $\Delta\lambda_{Bave}$ between a reflection wavelength km of the central core and an average value $\lambda_{B2ave}$ of reflection wavelengths km of the outer cores using the calculated profile of the reflection wavelength, wherein the first section of the core rod and the second sections of the core rod are selected based on the calculated difference $\Delta\lambda_{ave}$ and the calculated difference $\Delta\lambda_{Bave}$, and a relative refractive index difference $\Delta_1$ of the first section of the core rod with respect to the capillary is substantially the same as an average $\Delta_{2ave}$ of relative refractive index differences $\Delta_2$ of the second section of the core rod with respect to the capillary;

arranging the first section of the core rod in the central hole of the capillary and arranging the second sections of the core rod in the outer hole of the capillary; and drawing the capillary in which individual sections of the core rod have been arranged to satisfy the Formula (1).

3. The method according to claim 2, wherein a dopant to be added to the core rod is one type.

4. The method according to claim 2, wherein a difference $\delta\Delta_{ave}$ is −0.005% or more and 0.005% or less, where the difference $\delta\Delta_{ave}$ is a difference between the relative refractive index difference $\Delta_1$ of the first section of the core rod with respect to the capillary and the average $\Delta_{2ave}$ of the relative refractive index differences $\Delta_2$ of the second sections of the core rod with respect to the capillary.

5. The method according to claim 4, wherein the difference $\delta\Delta_{ave}$ is obtained using the following formula:

$\delta\Delta_{ave} = 2.22 \times 10^{-2} \times \Delta\lambda_{ave} - 9.77 \times 10^{-5} \times \Delta\lambda_{Bave} + 8.66 \times 10^{-3}$.

6. The multi-core optical fiber according to claim 1, wherein temperature dependence of a refractive index of the central core is substantially the same as temperature dependence of the average of refractive indices of the outer cores.

7. The multi-core optical fiber according to claim 6, wherein where a diameter $D_1$ of the central core is 4.66 μm or more and 4.89 μm or less, the average $d_{ave}$ is 33 μm or more and 37 μm or less, and the number $f_w$ is 45 times/m or more and 55 times/m or less, and $\delta D_2$ expressed in the following formula is −2.19% or more and 0.52% or less:

$\delta D_2 = \{(D_{2ave} - D_1)/D_1\} \times 100$, where $D_{2ave}$ represents an average of diameters $D_2$ of the outer cores.

8. The multi-core optical fiber according to claim 6, wherein a type of dopant to be added to the central core and a type of dopant to be added to the outer cores are the same, and concentration of the dopant to be added to the central core is substantially the same as an average of concentration of the dopant to be added to the outer cores.

9. The multi-core optical fiber according to claim 8, wherein the dopant to be added to the central core and the outer cores is one type.

10. The multi-core optical fiber according to claim 8, wherein a difference $\delta\Delta_{ave}$ is −0.005% or more and 0.005% or less, where the difference $\delta\Delta_{ave}$ is a difference between a relative refractive index difference $\Delta_1$ of the central core with respect to the cladding and an average $\Delta_{2ave}$ of the relative refractive index differences $\Delta_2$ of the outer cores with respect to the cladding.

11. The multi-core optical fiber according to claim 10, wherein the central core and the outer core are each provided with the FBG, and the difference $\delta\Delta_{ave}$ is obtained using the following formula:

$\delta\Delta_{ave} = 2.22 \times 10^{-2} \times \Delta\lambda_{ave} - 9.77 \times 10^{-5} \times \Delta\lambda_{Bave} + 8.66 \times 10^{-3}$, where $\Delta\lambda_{ave}$ is a difference between the dispersion value $\lambda_1$ of the central core and an average value $\lambda_{2ave}$ of dispersion values $\lambda_2$ of the outer cores, $\Delta\lambda_{Bave}$ is a difference between a reflection wavelength $\lambda_{B1}$ of the central core due to the FBG and an average value $\lambda_{B2ave}$ of reflection wavelengths $\lambda_{B2}$ of the outer cores due to the FBG.

12. The multi-core optical fiber according to claim 1, wherein fewer than all of effective refractive indices $n_{e2}$ of the outer cores satisfy the following formula:

$$n_{e1} \times \left(\frac{1}{fw} - B\right) < n_{e2} \times \left(\frac{1}{fw} + A\right) < n_{e1} \times \left(\frac{1}{fw} + B\right).$$

13. The multi-core optical fiber according to claim 12, wherein the average $n_{e2ave}$ is lower than the effective refractive index $n_{e1}$ and matches a ratio between an optical path length of the central core and an average of the optical path lengths of the outer cores.

14. The multi-core optical fiber according to claim 12, wherein a ratio between the effective refractive index $n_{e1}$ and the average $n_{e2ave}$ satisfies the following formula:

$$\frac{n_{e2ave}}{n_{e1}} = \frac{\left(\frac{1}{fw}\right)}{\sqrt{\left(\frac{1}{fw}\right)^2 + (2\pi d_{ave})^2}}.$$

15. The multi-core optical fiber according to claim 12, wherein the central core and the outer cores contain a first additive being germanium at the same concentration, and the outer cores contain a second additive that reduces the refractive index of the outer cores.

* * * * *